US012545765B2

(12) United States Patent
Olschewski et al.

(10) Patent No.: US 12,545,765 B2
(45) Date of Patent: Feb. 10, 2026

(54) OLIGOMER OR POLYMER, COMPOSITION, USE OF THE OLIGOMER OR POLYMER AND INTERMEDIATE

(71) Applicant: FRAUNHOFER-GESELLSCHAFT ZUR FÖRDERUNG DER ANGEWANDTEN FORSCHUNG E.V., Munich (DE)

(72) Inventors: Markus Olschewski, Darmstadt (DE); Elke Metzsch-Zilligen, Darmstadt (DE); Rudolf Pfaendner, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 894 days.

(21) Appl. No.: 17/640,174

(22) PCT Filed: Jul. 17, 2020

(86) PCT No.: PCT/EP2020/070333
§ 371 (c)(1),
(2) Date: Mar. 3, 2022

(87) PCT Pub. No.: WO2021/043489
PCT Pub. Date: Mar. 11, 2021

(65) Prior Publication Data

US 2022/0340717 A1 Oct. 27, 2022

(30) Foreign Application Priority Data

Sep. 6, 2019 (DE) ..................... 10 2019 213 606.0

(51) Int. Cl.
*C08G 79/04* (2006.01)
*C08L 85/02* (2006.01)

(52) U.S. Cl.
CPC .............. *C08G 79/04* (2013.01); *C08L 85/02* (2013.01)

(58) Field of Classification Search
None
See application file for complete search history.

(56) References Cited

U.S. PATENT DOCUMENTS

| | | | | |
|---|---|---|---|---|
| 2,612,488 | A * | 9/1952 | Nelson .................. | C08G 79/04 508/423 |
| 4,564,686 | A | 1/1986 | Ogata | |
| 5,777,008 | A | 7/1998 | Pitteloud | |
| 6,410,752 | B1 | 6/2002 | Kim et al. | |
| 10,138,354 | B2 | 11/2018 | Groos et al. | |
| 10,214,631 | B2 | 2/2019 | Pfaendner et al. | |
| 10,323,136 | B2 | 6/2019 | Pfaendner et al. | |
| 10,364,340 | B2 | 7/2019 | Pfaendner et al. | |
| 10,370,537 | B2 | 8/2019 | Pfaendner et al. | |
| 10,450,442 | B2 | 10/2019 | Pfaendner et al. | |
| 10,544,284 | B2 | 1/2020 | Pfaendner et al. | |
| 10,781,296 | B2 | 9/2020 | Groos et al. | |
| 10,913,743 | B2 | 2/2021 | Pfaendner et al. | |
| 11,292,859 | B2 | 4/2022 | Klein et al. | |
| 11,407,720 | B2 | 8/2022 | Fischer et al. | |
| 2002/0045765 | A1 | 4/2002 | Kim et al. | |
| 2016/0052927 | A1 | 2/2016 | Pfaendner et al. | |
| 2016/0272789 | A1 | 9/2016 | Pfaendner et al. | |
| 2017/0107375 | A1 | 4/2017 | Pfaendner et al. | |
| 2017/0121499 | A1 | 5/2017 | Pfaendner et al. | |
| 2017/0260362 | A1 | 9/2017 | Pfaendner et al. | |
| 2017/0260363 | A1 | 9/2017 | Pfaendner et al. | |
| 2017/0260366 | A1 | 9/2017 | Pfaendner et al. | |
| 2017/0267835 | A1 | 9/2017 | Groos et al. | |
| 2018/0186970 | A1 | 7/2018 | Groos et al. | |
| 2019/0248927 | A1 | 8/2019 | Klein et al. | |
| 2020/0231783 | A1 | 7/2020 | Pfaendner et al. | |
| 2020/0317886 | A1 | 10/2020 | Pfaendner et al. | |
| 2020/0361879 | A1 | 11/2020 | Fischer et al. | |
| 2021/0130582 | A1 | 5/2021 | Ciesielski et al. | |
| 2021/0388176 | A1 | 12/2021 | Metzsch-Zilligen et al. | |
| 2022/0073734 | A1 | 3/2022 | Polidar et al. | |
| 2022/0119624 | A1 | 4/2022 | Pfaendner et al. | |

(Continued)

FOREIGN PATENT DOCUMENTS

| | | | |
|---|---|---|---|
| EP | 0 685 519 | A1 | 12/1995 |
| EP | 0 768 314 | A1 | 4/1997 |
| EP | 2 061 829 | A1 | 5/2009 |
| JP | S54-54978 | A | 5/1979 |
| JP | S59-219295 | A | 12/1984 |
| JP | H11-43436 | A | 2/1999 |
| JP | 2001-002690 | A | 1/2001 |
| JP | 2002-088091 | A | 3/2002 |
| JP | 2003-286413 | A | 10/2003 |
| WO | 2008/028858 | A1 | 3/2008 |

OTHER PUBLICATIONS

Iwasaki et al (Synthesis and Characterization of Amphiphilic Polyphosphates with Hydrophilic Graft Chains and Cholesteryl Groups as Nanocarriers, Biomacromolecules, vol. 7, No. 5, 2006 pp. 1433-1438). (Year: 2006).*

(Continued)

*Primary Examiner* — Rachel Kahn

(74) *Attorney, Agent, or Firm* — Leydig, Voit & Mayer, Ltd.

(57) ABSTRACT

This object is achieved by an oligomer or polymer, comprising a phosphorus-comprising structural element described herein, its composition comprising the aforementioned oligomer or polymer and an organic component to be stabilized, and by the possible uses of the oligomers or polymers according to the invention, relating to a molding compound or a molded part, and relating to an intermediate suitable for synthesizing the oligomers or polymers according to the invention. Advantageous developments thereof are also described.

14 Claims, No Drawings

(56) References Cited

U.S. PATENT DOCUMENTS

2022/0162422 A1 5/2022 Pfaendner

OTHER PUBLICATIONS

Yasuzawa et al (Polymeric phospholipid analogues, 18. Synthesis and properties of a vinyl polymer containing both vitamin E and phosphatidylcholine analogous moieties Makromol. Chem., Rapid Commun. 6,727-731; 1985). (Year: 1985).*

Al-Malaika, Sahar "Learning From Mother Nature: Exploiting a Biological Antioxidant for the Melt Stabilisation of Polymers," *Macromol Symp* 176(1): 107-117 (2001).

Japan Patent Office, Notification of Reasons for Refusal in Japanese Patent Application No. 2022-514749 (Oct. 29, 2024).

Japan Patent Office, Notification of Reasons for Refusal in Japanese Patent Application No. 2022-514749 (Feb. 27, 2024).

Jones et al., Source-based nomenclature for single-strand homopolymers and copolymers (IUPAC Recommendations 2016), *Pure Appl Chem* 88(10-11): 1073-1100 (2016).

Kröhnke et al., "Antioxidants," Uhlmann's Encyclopedia of Industrial Chemistry, Wiley-VCH Verlag GmbH & Co. KGaA, pp. 1-36 (2015).

European Patent Office, International Search Report in International Application No. PCT/EP2020/070333 (Oct. 15, 2020).

European Patent Office, Written Opinion in International Application No. PCT/EP2020/070333 (Oct. 15, 2020).

International Bureau of WIPO, International Preliminary Report on Patentability in International Application No. PCT/EP2020/070333 (Mar. 8, 2022).

* cited by examiner

OLIGOMER OR POLYMER, COMPOSITION, USE OF THE OLIGOMER OR POLYMER AND INTERMEDIATE

CROSS-REFERENCE TO RELATED APPLICATIONS

This patent application is the U.S. national phase of International Application No. PCT/EP2020/070333, filed on Jul. 17, 2020, which claims the benefit of German Patent Application No. 10 2019 213 606.0, filed Sep. 6, 2019, the disclosures of which are incorporated herein by reference in their entireties for all purposes.

The present invention relates to an oligomer or polymer, or a composition comprising said oligomer or polymer, which are particularly suitable as a stabilizer for organic materials. In addition, the present invention relates to an intermediate for synthesizing the aforementioned oligomers or polymers.

Organic materials, such as plastics, are subject to aging processes, which ultimately lead to a loss of desired properties, such as e.g. mechanical characteristic values. This process, called autoxidation, leads to changes in the polymer chain, for example, in molecular weight or the formation of new chemical groups, arising from radical chain cleavages through mechanochemical processes or through UV radiation in the presence of oxygen. Stabilizers are therefore used to prevent or at least delay said aging. Important representatives of stabilizers are antioxidants, which interfere with the free radicals formed during autoxidation and thus interrupt the degradation process. A distinction is generally made between primary antioxidants, which can react directly with oxygen-comprising free radicals or C-radicals, and secondary antioxidants, which react with intermediately formed hydroperoxides (see C. Kröhnke et al. Antioxidants in Ullmann's encyclopedia of industrial chemistry, Wiley-VCH Verlag, Weinheim 2015). Typical representatives of primary antioxidants are, for example, phenolic antioxidants, amines, but also lactones. Classes of secondary antioxidants are phosphorus compounds, such as e.g. phosphites and phosphonites, but also organo-sulphur compounds, such as e.g. thioethers or disulfides. Usually, in practice, primary and secondary antioxidants are often combined, resulting in a synergistic effect.

Plastics made from fossil raw materials, such as crude oil or natural gas, are increasingly being supplemented or replaced by plastics based on renewable raw materials that are accessible via biotechnological processes. However, the primary and secondary antioxidants used therefor (and for plastics made from fossil raw materials) are still not extensively based on renewable raw materials.

A further challenge for antioxidants, in particular for food applications and for the use of plastics at elevated temperatures, is to keep the migration from the plastic and the volatility of the products used as low as possible without negatively affecting the effectiveness.

Basically, primary antioxidants made from renewable raw materials, which are also occasionally used in plastics, are known. A typical example are tocopherols (vitamin E). Like common antioxidants, tocopherols have a sterically hindered phenol structure and can be used alone or in combination with secondary antioxidants (for example, S. Al Malaika, Macromol. Symp. 2001, 176, 107). For example, tocopherols can be isolated from natural substances, such as e.g. wheat germ oil, sunflower oil or olive oil. Other well-known phenolic antioxidants from natural substances whose antioxidant effect has been proven in polymers are, for example, quercetin, hyperin, rutin, dihydromyrecetin, sylimarin, curcumin, rosmarinic acid or cardanol.

Substances having a high molecular weight, in particular oligomers or polymers, can preferably be used to reduce the migration and volatility of antioxidants.

The production and effectiveness of said antioxidants are described, for example, in the following patents:

EP 2 061 829 (Preparation of liquid polymeric phosphites and phosphonites for use as stabilizers)

EP 0 685 519 (Oligomeric HALS-phosphites and HALS-phosphonites as stabilizers)

However, the known oligomeric and polymeric antioxidants are not based on renewable raw materials and/or do not comprise a 6-hydroxychroman core.

It was therefore an object of the present invention to provide effective oligomeric and polymeric antioxidants partly or largely based on renewable raw materials.

This object is achieved by an oligomer or polymer, comprising a phosphorus-comprising structural element described herein, its composition comprising the aforementioned oligomer or polymer and an organic component to be stabilized and by the possible uses of the oligomers or polymers according to the invention, relating to a molding compound or a molded part, and relating to an intermediate suitable for synthesizing the oligomers or polymers according to the invention. Advantageous developments thereof are also described.

The present invention thus relates to an oligomer or polymer, comprising a structure according to the general Formula I as a structural element Formula I

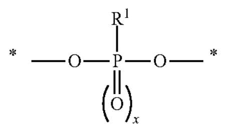

wherein $R^1$ is defined according to Formula II below

Formula II

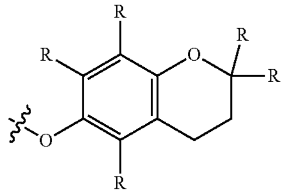

wherein

R is the same or different at each occurrence and is selected from the group consisting of hydrogen or linear or branched alkyl radicals having from 1 to 36 carbon atoms, and x is 0 or 1.

For the purposes of the present invention, the term oligomer or polymer is generally used in accordance with the definition made by IUPAC, as defined in Pure Appl. Chem. 2016; 88 (10-11): 1073-1100.

In particular, an oligomer is understood to be a molecule having 3-10 repeating units, a polymer is understood to be a molecule having more than 10 repeating units. This generally results in average molecular weights (number average) of about 1000 to 4000 for an oligomer and more than 4000 for a polymer.

It was surprisingly found that the oligomers or polymers according to the invention are highly effective.

According to a preferred embodiment, $R^1$ is defined according to Formula IIa below.

Formula IIa

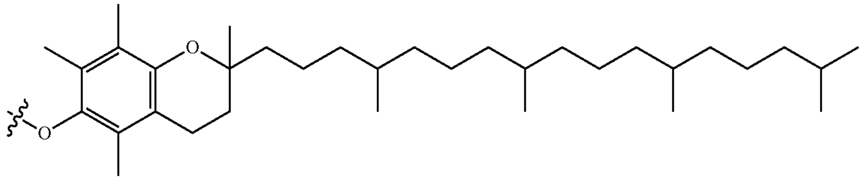

A further preferred embodiment provides that the oligomer or polymer comprises the following repeating unit according to Formula III, Formula III

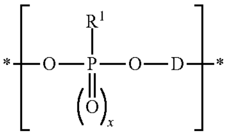

wherein D is the same or different at each occurrence and is a functionality derived from a diol.

It is preferred here that the functionality derived from a diol is a functionality derived from an aliphatic, aromatic or heterocyclic diol.

According to exemplary embodiments, the functionality derived from a diol is a) a functionality derived from an aliphatic diol and is preferably derived from ethylene glycol, 1,3-propylene glycol, 1,2-propylene glycol, 1,4-butanediol, 1,5-pentanediol, 1,6-hexanediol, 1,8-octanediol, 1,10-decanediol, 1,12-dodecanediol, 1,4-cyclohexanediol, 1,3-cyclohexanediol and/or 1,4-cyclohexanedimethanol, b) a functionality derived from an aromatic diol and is preferably derived from hydroquinone, resorcinol, 1,5-, 2,6- or 2,7-dihydroxynaphthalene, vanillyl alcohol or the following diols

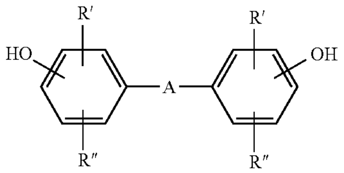

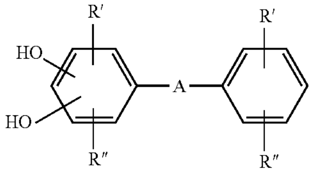

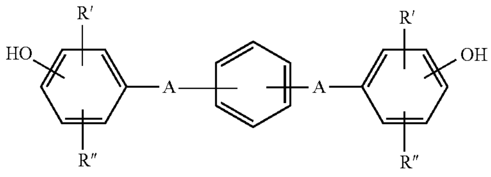

-continued

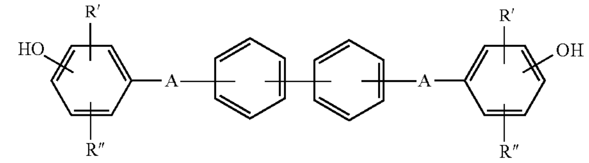

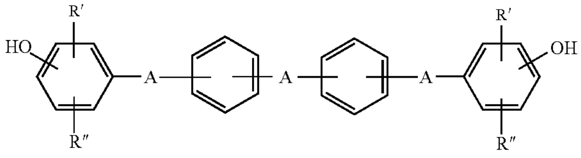

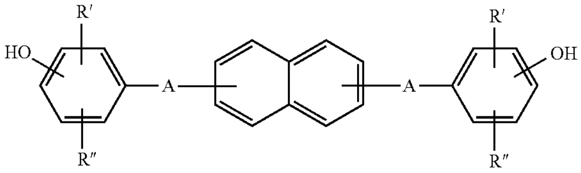

wherein, respectively independent of one another,

A means a direct bond, —O—, —$SO_2$—, —C(O)—, —$CH(CH_3)$— or —$C(CH_3)_2$—, and R' and R'' are the same or different on each occurrence and are selected from the group consisting of linear or branched alkyl moieties having 1 to 36 carbon atoms, c) a functionality derived from a heterocyclic diol and preferably derived from hydroxyethyl-4-hydroxytetramethylpiperidine, 1,4-dithiane-2,5-diol, or d) a functionality derived from the following diols 2,3-dimethoxy-1,4-butanediol

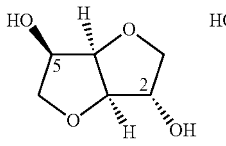

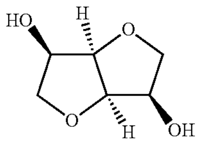

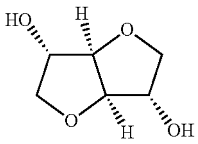

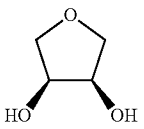

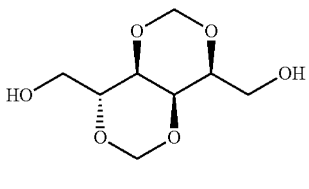

-continued

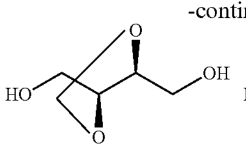

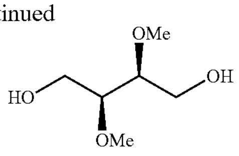

According to a further embodiment of the present invention, the oligomer or copolymer is a co-oligomer or copolymer, that is, comprises at least two different repeating units which are based on the repeating unit according to Formula I.

An embodiment thereof provides, for example, that the oligomer or polymer has the following repeating units according to Formula I, which correspond to the following definitions according to Formula III and IIIa:

Formula III

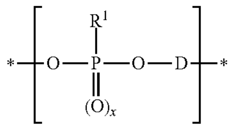

Formula IIIa

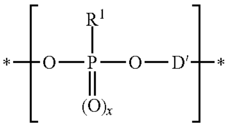

Here, $R^1$, D and x are as defined above and the definition of D' corresponds to the definition of D with the proviso that D and D' are derived from different diols.

For example, the group D derived from a diol as used in Formula III above may be selected from one or more diols as listed under a) or b) above.

The group D' derived from a diol can be, for example, a diol selected from a diol as described above under c).

For example, the molar ratio of the repeating units III to IIIa can be from 0.1:99.9 to 50:50, preferably from 0.5:99.5 to 10:90.

The oligomer or polymer preferably comprises exclusively repeating units according to Formula I, in which x=0. Alternatively, it is also possible for the oligomer or polymer to comprise both repeating units according to Formula I, in which x=0, and repeating units according to Formula I, in which x=1, wherein the molar ratio of the repeating units according to Formula I, in which x=0, to the repeating units according to Formula I, in which x=1, is from 50:50 to <100: >0, preferably 90:10 to 99.9:0.1.

The present invention also relates to a composition comprising at least one organic component to be stabilized and at least one oligomer or polymer according to the invention as described above.

For example, it can be provided that the composition comprises at least one oligomer or polymer in a proportion by weight, based on the entire composition, of 0.01 to 5.0 parts by weight, preferably 0.02 to 2.0 parts by weight, particularly preferably 0.05 to 1.0 parts by weight.

A preferred embodiment provides that the at least one organic component to be stabilized is selected from the group consisting of

- plastics (synonymous with "polymers"), in particular thermoplastic, elastomeric or duromer plastics,
- at least one oil, fat or wax, in particular mineral oils, vegetable fats or oils or animal fats or oils, for example, palm oil, olive oil, rapeseed oil, linseed oil, soybean oil, sunflower oil, castor oil, fish oils or beef tallow and oils, fats or waxes on the basis of, for example, synthetic esters,
- mineral or synthetic lubricants, hydraulic oils, engine oils, turbine oils, gear oils, metalworking fluids or lubricating greases, and
- polymerizable monomers, in particular radically polymerizable monomers, in particular monomers which can be radically polymerized by initiators like peroxides or oxygen, such as e.g. acrylic esters, methacrylic esters, acrylonitrile, styrenes or vinyl chloride.

Suitable thermoplastic or duromer polymers are in particular:

a) polymers from olefins or diolefins, such as e.g. polyethylene (LDPE, LLDPE, VLDPE, ULDPE, MDPE, HDPE, UHMWPE), metallocene PE (m-PE), polypropylene, polyisobutylene, poly-4-methyl-pentene-1, polybutadiene, polyisoprene, such as e.g. natural rubber (NR), polycyclooctene, polyalkylene-carbon monoxide copolymers, and copolymers in the form of random or block structures, such as e.g. polypropylene-polyethylene (EP), EPM or EPDM with, for example, 5-ethylidene-2-norbornene as a comonomer, ethylene-vinyl acetate (EVA), ethylene-acrylic esters, such as e.g. ethylene-butyl acrylate, ethylene-acrylic acid and its salts (ionomers), and terpolymers, such as e.g. ethylene-acrylic acid-glycidyl (meth)acrylate, graft polymers, such as e.g. polypropylene-graft-maleic anhydride, polypropylene-graft-acrylic acid, polyethylene-graft-acrylic acid, polyethylene-polybutylacrylate-graft-maleic anhydride and blends, such as e.g. LDPE/LLDPE or also long-chain-branched polypropylene copolymers which are produced with alpha-olefins as comonomers, such as e.g. with 1-butene, 1-hexene, 1-octene or 1-octadecene b) polystyrene, polymethylstyrene, poly-alpha-methylstyrene, polyvinylnaphthalene, polyvinylbiphenyl, polyvinyltoluene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile (SAN), styrene-acrylonitrile-acrylate (ASA), styrene-ethylene, styrene-maleic anhydride polymers including corresponding graft copolymers, such as e.g. styrene on butadiene, maleic anhydride on SBS or SEBS, and graft copolymers of methyl methacrylate, styrene-butadiene and ABS (MABS), and hydrogenated polystyrene derivatives, such as e.g. polyvinylcyclohexane c) halogen-comprising polymers, such as e.g. polyvinyl chloride (PVC), polychloroprene and polyvinylidene chloride (PVDC), copolymers of vinyl chloride and vinylidene chloride or of vinyl chloride and vinyl acetate, chlorinated polyethylene, polyvinylidene fluoride, epichlorohydrin homo and copolymers, in particular with ethylene oxide (ECO)

d) polymers of unsaturated esters, such as e.g. polyacrylates and polymethacrylates like polymethyl methacrylate (PMMA), polybutyl acrylate, polylauryl acrylate, polystearyl acrylate, polyglycidyl acrylate, polyglycidyl methacrylate, polyacrylonitrile, polyacrylamide, copolymers like e.g. polyacrylonitrile-polyalkyl acrylate, e) polymers of unsaturated alcohols and derivatives, such as e.g. polyvinyl alcohol, polyvinyl acetate, polyvinyl butyral, polyallyl phthalate, polyallyl melamine f)

polyacetals, such as e.g. polyoxymethylene (POM) or copolymers with, for example, butanal, g) polyphenylene oxides and blends with polystyrene or polyamides, h) polymers of cyclic ethers, such as e.g. polyethylene glycol, polypropylene glycol, polyethylene oxide, polypropylene oxide, polytetrahydrofuran, i) polyurethanes, from hydroxy-terminated polyethers or polyesters and aromatic or aliphatic isocyanates, such as for example 2,4- or 2,6-tolylene diisocyanate or methylenediphenyl diisocyanate, in particular also linear polyurethanes (TPU), polyureas, j) polyamides, such as e.g. polyamide 6, 6.6, 6.10, 4.6, 4.10, 6.12, 10.10, 10.12, 12.12, polyamide 11, polyamide 12 and (partly) aromatic polyamides, such as e.g. polyphthalamides, for example produced from terephthalic acid and/or isophthalic acid and aliphatic diamines, such as e.g. hexamethylenediamine or m-xylylenediamine, or from aliphatic dicarboxylic acids, such as e.g. adipic acid or sebacic acid, and aromatic diamines, such as e.g. 1,4- or 1,3-diaminobenzene, blends of different polyamides, such as e.g. PA-6 and PA 6.6 or blends of polyamides and polyolefins, such as e.g. PA/PP k) polyimides, polyamide-imides, polyetherimides, polyesterimides, poly(ether)ketones, polysulfones, polyethersulfones, polyarylsulfones, polyphenylene sulfides, polybenzimidazoles, polyhydantoins, I) polyesters made from aliphatic or aromatic dicarboxylic acids and diols or from hydroxycarboxylic acids, such as e.g. polyethylene terephthalate (PET), polybutylene terephthalate (PBT), polypropylene terephthalate (PTT), polyethylene naphthylate (PEN), poly-1,4-dimethylolcyclohexane terephthalate, polyhydroxybenzoate, polyhydroxynaphthalate, polylactic acid (PLA), polyhydroxybutyrate (PHB), polyhydroxyvalerate (PHV), polyethylene succinate, polytetramethylene succinate, polycaprolactone m) polycarbonates, polyester carbonates and blends, such as e.g. PC/ABS, PC/PBT, PC/PET/PBT, PC/PA n) cellulose derivatives, such as e.g. cellulose nitrate, cellulose acetate, cellulose propionate, cellulose butyrate, o) epoxy resins consisting of di- or polyfunctional epoxy compounds in combination with, for example, hardeners based on amines, anhydrides, dicyandiamide, mercaptans, isocyanates or catalytic hardeners, p) phenolic resins, such as e.g. phenol-formaldehyde resins, urea-formaldehyde resins, melamine-formaldehyde resins, q) unsaturated polyester resins from unsaturated dicarboxylic acids and diols with vinyl compounds, for example styrene, alkyd resins, r) silicones, for example based on dimethylsiloxanes, methyl-phenyl-siloxanes or diphenylsiloxanes, for example terminated with vinyl groups s) and mixtures, combinations or blends of two or more of the aforementioned polymers.

If the polymers specified under a) to r) are copolymers, they can be present in the form of random, block or tapered structures.

Furthermore, the polymers mentioned can be present in the form of linear, branched, star-shaped or hyper-branched structures.

If the polymers specified under a) to r) are stereoregular polymers, they can be present in the form of isotactic, stereotactic, but also atactic forms or as stereoblock copolymers.

Furthermore, the polymers specified under a) to r) can have both amorphous and (partially) crystalline morphologies.

Optionally, the polyolefins mentioned under a) can also be crosslinked, for example crosslinked polyethylene, which is then referred to as X-PE.

Furthermore, the present compounds can be used to stabilize rubbers and elastomers. This can be natural rubber (NR) or synthetic rubber materials here. Further suitable rubbers and elastomers are, in particular, butadiene rubber (BR), styrene-butadiene rubber (SBR), chlorobutadiene rubber (CR), acrylonitrile-butadiene rubber (NBR), hydrogenated acrylonitrile-butadiene rubber (HNBR), ethylene-propylene-diene rubber (EPDM), butyl rubber (IIR), ethylene-epichlorohydrin rubber (ECO) or ethylene acrylate rubber (AEM).

Further particularly preferred are polymers from renewable raw materials, such as e.g. polylactic acid (PLA), polyhydroxybutyric acid, polyhydroxyvaleric acid, polybutylene succinate (PBS) or polybutylene succinate-co-adipate (PBSA).

A further embodiment of the composition according to the invention provides that the composition comprises at least one additive selected from the group consisting of primary antioxidants, secondary antioxidants, UV absorbers, light stabilizers, metal deactivators, filler deactivators, antiozonants, nucleating agents, antinucleating agents, impact modifiers, plasticizers, lubricants, rheology modifiers, thixotropic agents, chain extenders, processing aids, mold release agents, flame retardants, pigments, dyes, optical brighteners, antimicrobial agents, antistatic agents, slip agents, antiblocking agents, coupling agents, crosslinking agents, anticrosslinking agents, hydrophilic agents, hydrophobic agents, adhesion promoters, dispersants, compatibilizers, oxygen scavengers, acid scavengers, blowing agents, prodegradants, defoaming aids, odor scavengers, marking agents, antifogging agents, fillers and reinforcements.

In a preferred embodiment, the compositions comprise in particular acid scavengers, for example based on salts of long-chain acids, such as e.g. calcium stearate, magnesium stearate, zinc stearate, aluminum-stearate, calcium laurate, calcium lactate, calcium stearoyl-2-lactylate or hydrotalcites, in particular synthetic hydrotalcites based on aluminum, magnesium and zinc, and hydrocalumites, zeolites and/or alkaline earth metal oxides, such as e.g. calcium oxide and magnesium oxide, and/or alkaline earth metal carbonates, such as e.g. calcium carbonate, magnesium carbonate or dolomite, and/or hydroxides like brucite.

In a further preferred embodiment, the compositions comprise light stabilizers from the group of hindered amines (HALS) and/or dispersants and/or filler deactivators.

Suitable primary antioxidants (A) are phenolic antioxidants, amines and lactones. Furthermore, ascorbic acid can be considered as a primary antioxidant.

Suitable synthetic phenolic antioxidants are, for example:

alkylated monophenols, such as e.g. 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4- methoxymethylphenol, linear or branched nonylphenols, such as e.g. 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, and mixtures thereof;

alkylthiomethyl phenols, such as e.g. 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

hydroquinones and alkylated hydroquinones, such as e.g. 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxylphenyl)adipate;

tocopherols, such as e.g. α-, β-, γ-, δ-tocopherol and mixtures thereof (vitamin E);

hydroxylated thiodiphenyl ethers, such as e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;

alkylidenebisphenols, such as e.g. 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol, 4,4'-methylenebis(6-tert-butyl-2-methyl-phenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-h hydroxy-5'-methylbenzyl)-6-tert-butyl-4-methylphenyl]terephthalate, 1,1-bis(3,5-dimethyl-2-hydroxyphenyl) butane, 2,2-bis(3,5-di-tert-butyl-4-hydroxyphenyl) propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds, such as e.g. 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-di-tert-butylbenzyl mercaptoacetate, tris(3,5-di-tert-butyl-4-hydroxybenzyl) amine, bis(4-tert-butyl-3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzylmercaptoacetate; hydroxybenzylated malonates, such as e.g. dioctadecyl 2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis-(3,5-di-tert-butyl-4-hydroxybenzyl) malonate;

aromatic hydroxybenzyl compounds, such as e.g. 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

triazine compounds, such as e.g. 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate;

benzyl phosphonates, such as e.g. dimethyl 2,5-di-tert-butyl-4-hydroxybenzylphosphonate, diethyl 3,5-di-tert-butyl-4-hydroxybenzylphosphonate, dioctadecyl-3,5-di-tert-butyl-4-hydroxybenzylphosphonate, di-octadecyl-5-tert-butyl-4-hydroxy-3-methylbenzylphosphonate, the calcium salt of the monoethyl ester of 3,5-di-tert-butyl-4-hydroxybenzylphosphonic acid;

acylaminophenols, such as e.g. 4-hydroxylauranilide, 4-hydroxystearanilide, octyl N-(3,5-di-tert-butyl-4-hydroxyphenyl)carbamate;

esters of β-(3,5-di-tert-butyl-4-hydroxyphenyl)propionic acid with monohydric or polyhydric alcohols, for example methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(5-tert-butyl-4-hydroxy-3-methylphenyl)propionic acid with monohydric or polyhydric alcohols, for example methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of β-(3,5-dicyclohexyl-4-hydroxyphenyl)propionic acid with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of (3,5-di-tert-butyl-4-hydroxyphenyl)acetic acid with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as e.g. N,N'-bis(3,5-di-tert-butyl-4-hydroxyphenylpropionyl)hexamethylenediamide, N,N'-bis(3,5-di-tert-butyl-4-hydroxyphenylpropionyl) hexamethylenediamide, N,N'-bis(3,5-di-tert-butyl-4-hydroxyphenylpropionyl)hexamethylenediamide, N,N'-bis-(3,5-di-tert-butyl-4-hydroxyphenylpropionyl) hydrazide, N,N'-bis[2-(3-[3,5-di-tert-butyl-4-hydroxyphenyl]propionyloxy)ethyl]oxamide (Naugard®XL-1 sold by Uniroyal);

Particularly preferred phenolic antioxidants are:

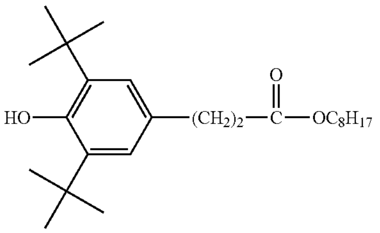

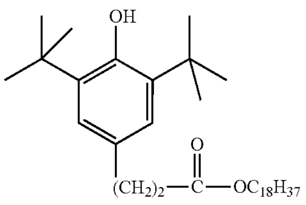

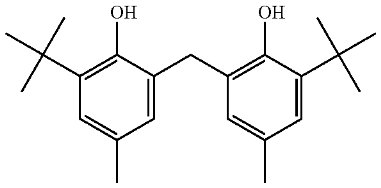

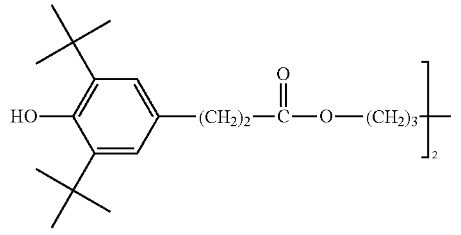

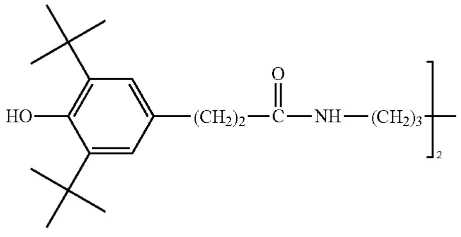

-continued

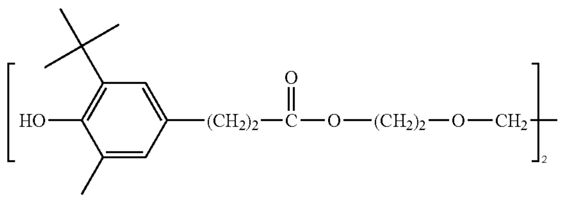

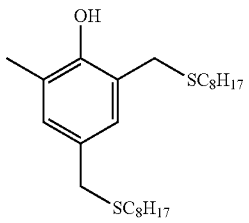

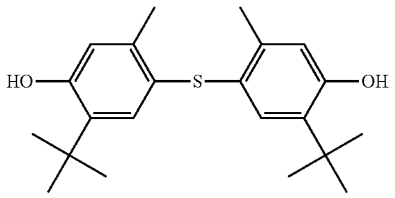

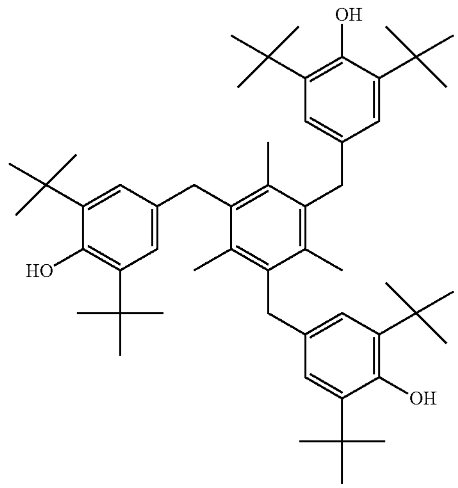

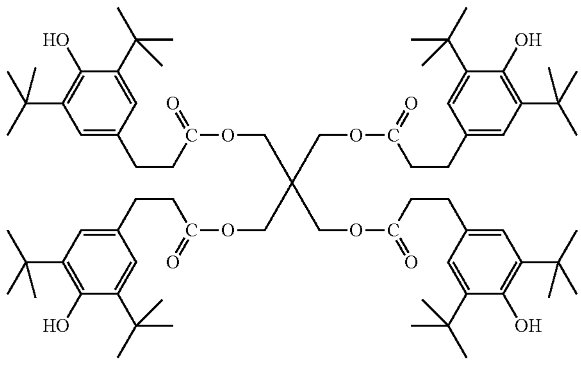

-continued
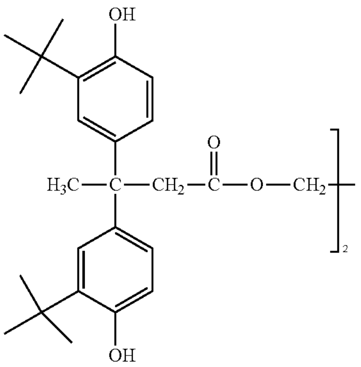
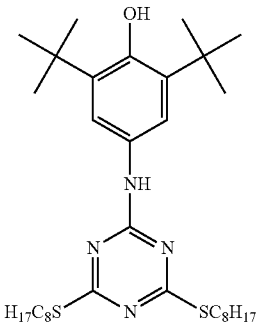
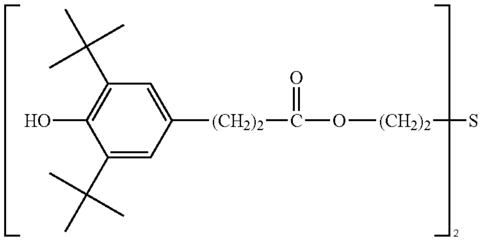
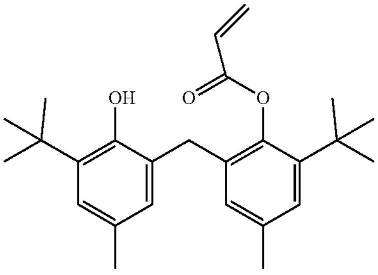
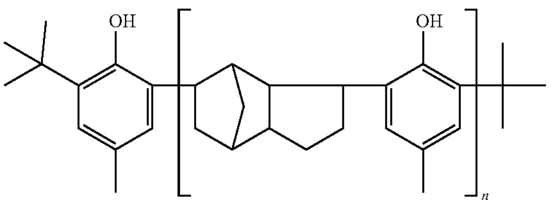
-continued
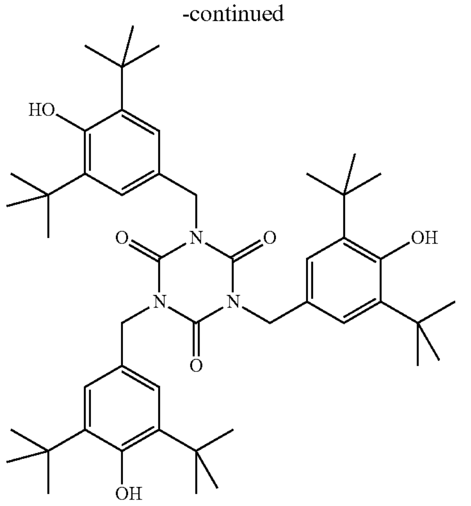
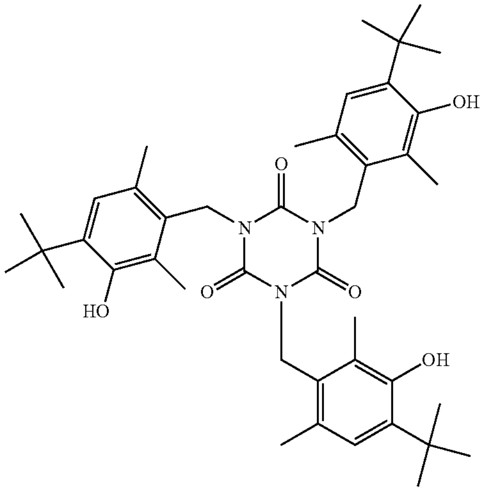
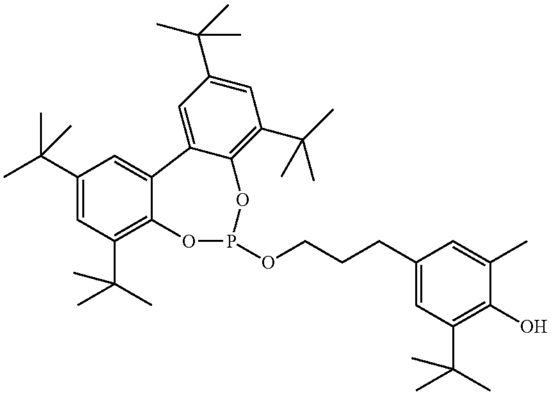
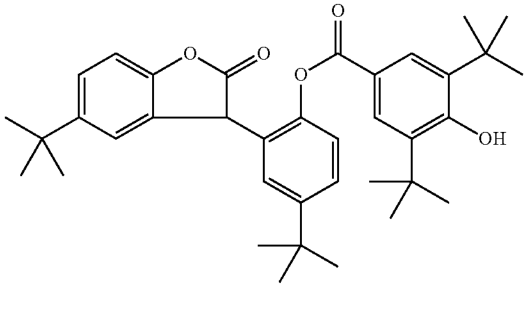

Suitable aminic antioxidants are, for example:

N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example, p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxyphenyl)amine, 2,6-di-tert-butyl-4-dimethylaminomethyl-phenol, 2,4'-diaminodiphenylmethane, 4,4'-diaminodiphenylmethane, N,N,N',N'-tetramethyl-4,4'-diaminodiphenylmethane, 1,2-bis[(2-methyl-phenyl) amino]ethane, 1,2-bis(phenylamino)propane, (o-tolyl) biguanide, bis[4-(1',3'-dimethylbutyl)phenyl]amine, tert-octylated N-phenyl-1-naphthylamine, a mixture of mono- and di-alkylated tert-butyl/tert-octyldiphenylamines, a mixture of mono- and di-alkylated nonyldiphenylamines, a mixture of mono- and di-alkylated dodecyldiphenylamines, a mixture of mono- and di-alkylated isopropyl/isohexyl-diphenylamines, a mixture of mono- and di-alkylated tert-butyldiphenylamines, 2,3-dihydro-3,3-dimethyl-4H-1,4-benzothiazine, phenothiazine, a mixture of mono- and di-alkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, and mixtures or combinations thereof.

Further preferred aminic antioxidants are hydroxylamines or N-oxides (nitrones), such as e.g. N,N-dialkylhydroxylamines, N,N-dibenzylhydroxylamine, N,N-dilaurylhydroxylamine, N,N-distearylhydroxylamine, N-benzyl-α-phenylnitrone, N-octadecyl-α-hexadecylnitrone, and Genox EP (SI Group) according to the formula:

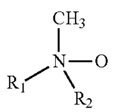

$R_1$, $R_2$=$C_{14}$-$C_{24}$ alkyl
Genox EP

Suitable lactones are benzofuranones and indolinones, such as e.g. 3-(4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-(2-hydroxyethoxy]phenyl)benzofuran-2-one), 5,7-di-tert-butyl-3-(4-ethoxy-phenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

Suitable secondary antioxidants are phosphorus compounds, such as e.g. phosphites and phosphonites, and organo-sulphur compounds, such as e.g. sulfides and disulfides.

Suitable phosphites/phosphonites are, for example:

triphenyl phosphite, diphenyl alkyl phosphites, phenyl dialkyl phosphites, tri(nonylphenyl) phosphite, trilauryl phosphites, trioctadecyl phosphite, distearyl pentaerythritol diphosphite, tris-(2,4-di-tert-butylphenyl) phosphite, diisodecylpentaerythritol diphosphite, bis(2,4-di-tert-butylphenyl)pentaerythritol diphosphite, (2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearylsorbitol triphosphite, tetrakis (2,4-di-tert-butylphenyl)-4,4'-biphenylenediphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocine, 2,2',2"-nitrilo[triethyltris(3,3",5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

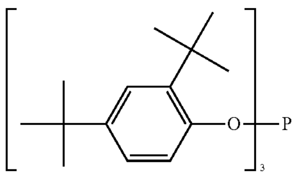

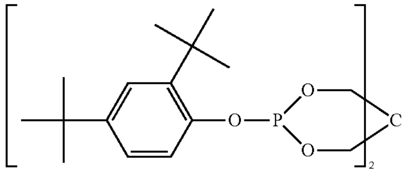

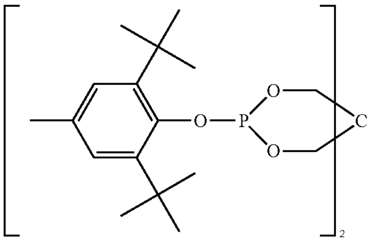

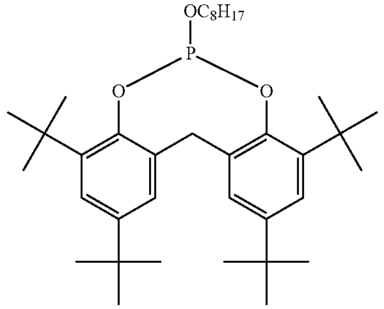

-continued

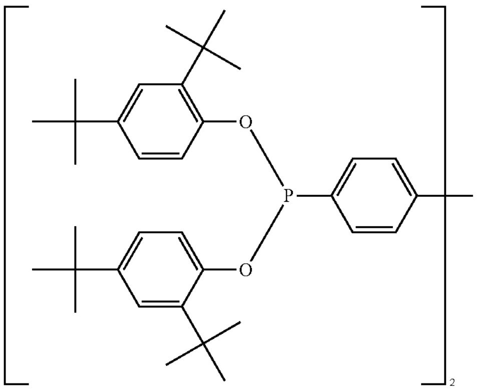

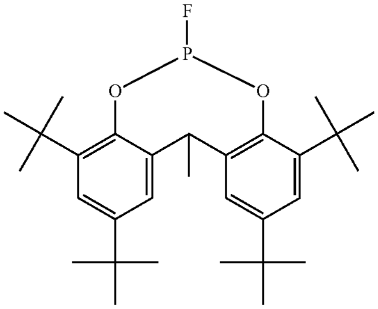

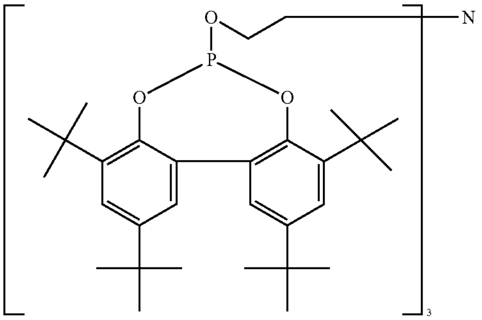

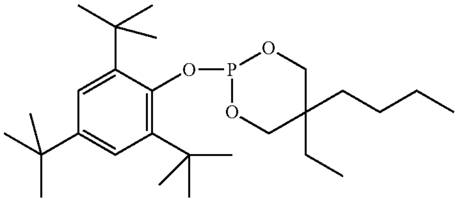

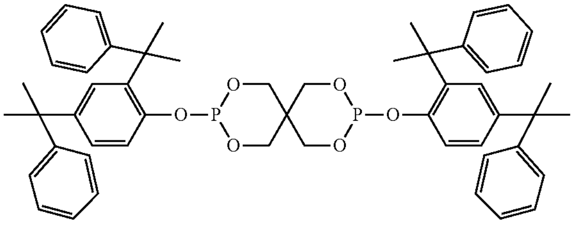

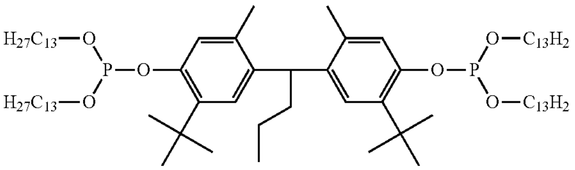

-continued

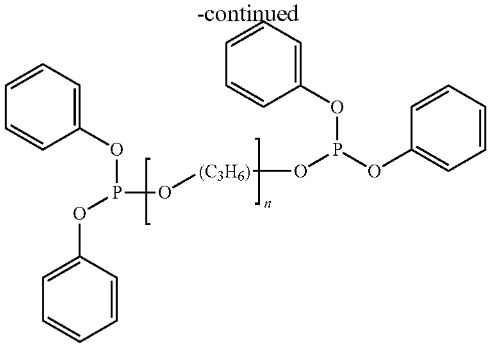

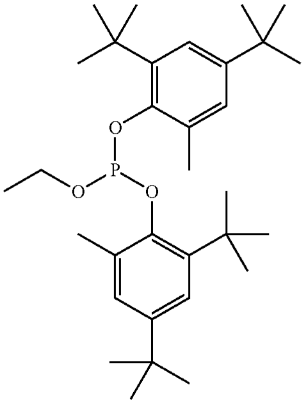

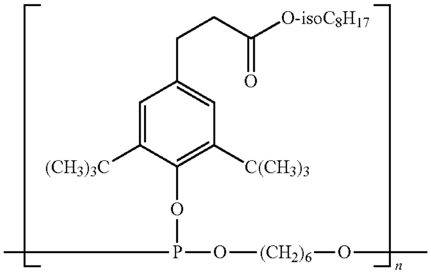

Suitable sulfur compounds are, for example, distearyl thiodipropionate, dilauryl thiodipropionate, ditridecyldithiopropionate, ditetradecylthiodipropionate, 3-(dodecylthio)-, 1,1'-[2,2-bis[[3-(dodecylthio)-1-oxopropoxy]methyl]-1,3-propanediyl]propanoic acid ester.

Suitable light stabilizers are, for example, compounds based on 2-(2'-hydroxyphenyl)benzotriazoles, 2-hydroxybenzophenones, esters of benzoic acids, acrylates, oxamides and 2-(2-hydroxyphenyl)-1,3,5-triazines.

Suitable 2-(2'-hydroxyphenyl)benzotriazoles are, for example, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chloro-benzotriazole, 2-(3'-sec-butyl-5'-tert-butyl-2'-hydroxy-phenyl) benzotriazole, 2-(2'-hydroxy-4'-octyloxy-phenyl)benzotriazole, 2-(3',5'-di-tert-amyl-2'-hydroxyphenyl)benzotriazole, 2-(3',5'-bis(α,α-dimethyl-benzyl)-2'-hydroxyphenyl)benzotriazole, 2-(3'-tert-butyl-2'-hydroxy-5'-(2-octyl-oxy-carbonylethyl)phenyl)-5-chlorobenzotriazole, 2-(3'-tert-butyl-5'-[2-(2-ethylhexyloxy)carbonyl-ethyl]-2'-hydroxyphenyl)-5-chlorobenzotriazole, 2-(3'-tert-butyl-2'-hydroxy-5'-(2-methoxycarbonyl-ethyl)phenyl)-5-chlorobenzo-triazole, 2-(3'-tert-butyl-2'-hydroxy-5'-(2-methoxycarbonylethyl)

phenyl)-benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)-carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$—]-2, wherein R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl] benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-trihydroxy and 2'-hydroxy-4,4'-dimethyloxy derivatives of 2-hydroxybenzophenones.

Suitable acrylates are, for example, ethyl α-cyano-β,β-diphenyl acrylate, isooctyl α-cyano-β,β-diphenyl acrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-((β-carbomethoxy-β-cyanovinyl)-2-methylindoline.

Suitable esters of benzoic acids are, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl 3,5-di-tert-butyl-4-hydroxybenzoate, octa-decyl 3,5-di-tert-butyl-4-hydroxybenzoate, 2-methyl-4,6-di-tert-butylphenyl 3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-, ethyloxanilide, N,N'-bis(3-dimethylaminopropyl)oxamide, 2-ethoxy-5-tert-butyl-2'-ethoxanilide and its mixtures with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxy-phenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxy-propoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylal-N'-salicyloylhydrazine, N,N" bis (salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyldihydrazide, oxanilide, isophthaloyldihydrazide, sebacoylbisphenylhydrazide, N,N'-diacetyladipoyldihydrazide, N,N'-bis(salicyloyl)oxylyldihydrazide, N,N'-bis(salicyloyl)thiopropionyldihydrazide.

Suitable hindered amines are, for example, 1,1-bis(2,2,6,6-tetramethyl-4-piperidyl)succinate, bis(1,2,2,6,6-pentamethyl-4-piperidyl)sebazate, bis(1-octyloxy-2,2,6,6-tetramethyl-4-piperidyl)sebazate, bis(1,2,2,6,6-pentamethyl-4-piperidyl)-n-butyl-3,5-di-tert-butyl 4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)-nitrilotriacetate, tetrakis(2,2,6,6-tetramethyl-4-piperidyl)-1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products from N,N'-bis(2,2,6,6-tetramethyl-4-piperidyl) hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro[4,5]decane and epichlorohydrin.

Particularly preferred hindered amines are the following:

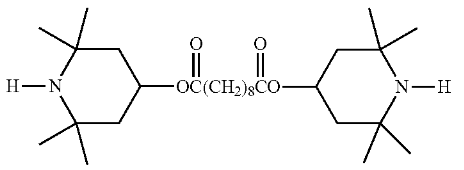

I

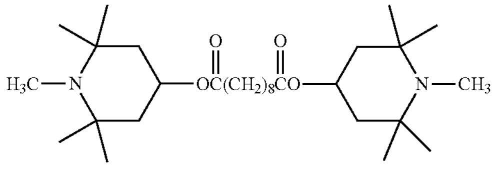

-continued
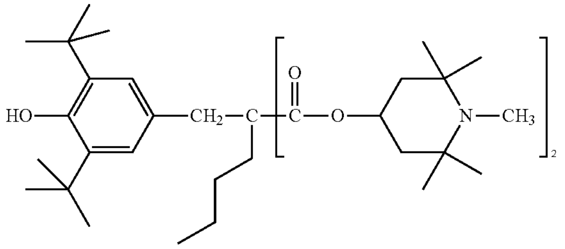
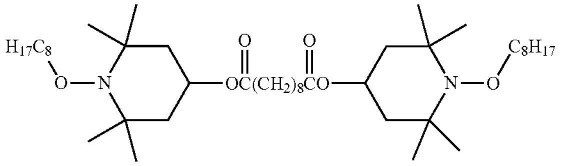
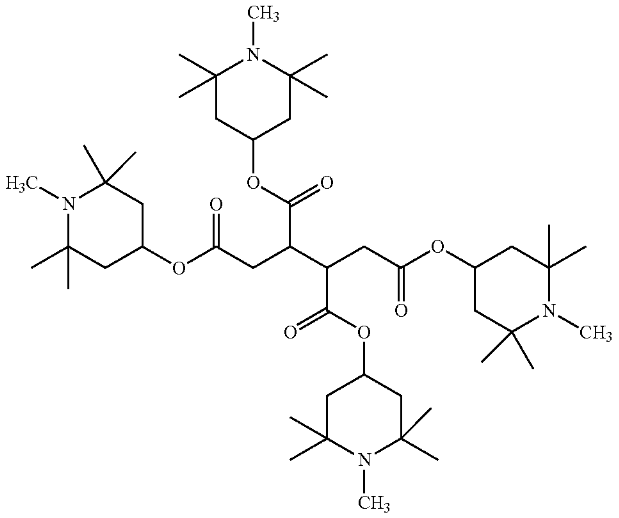
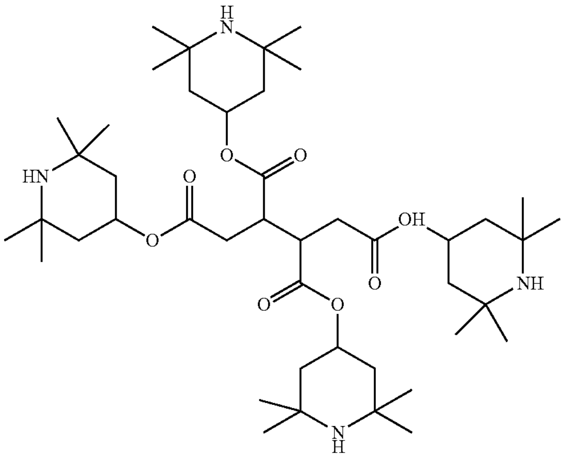
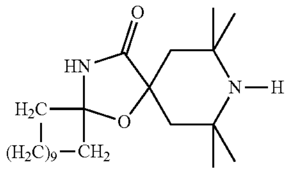
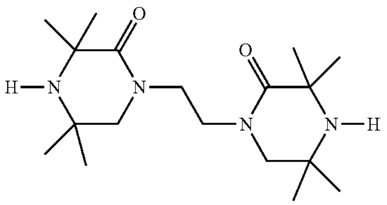
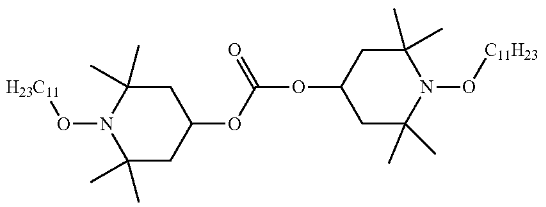
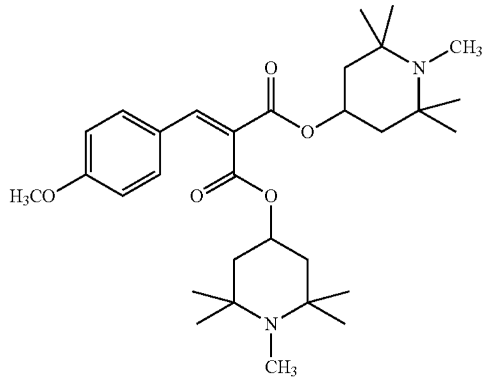

-continued
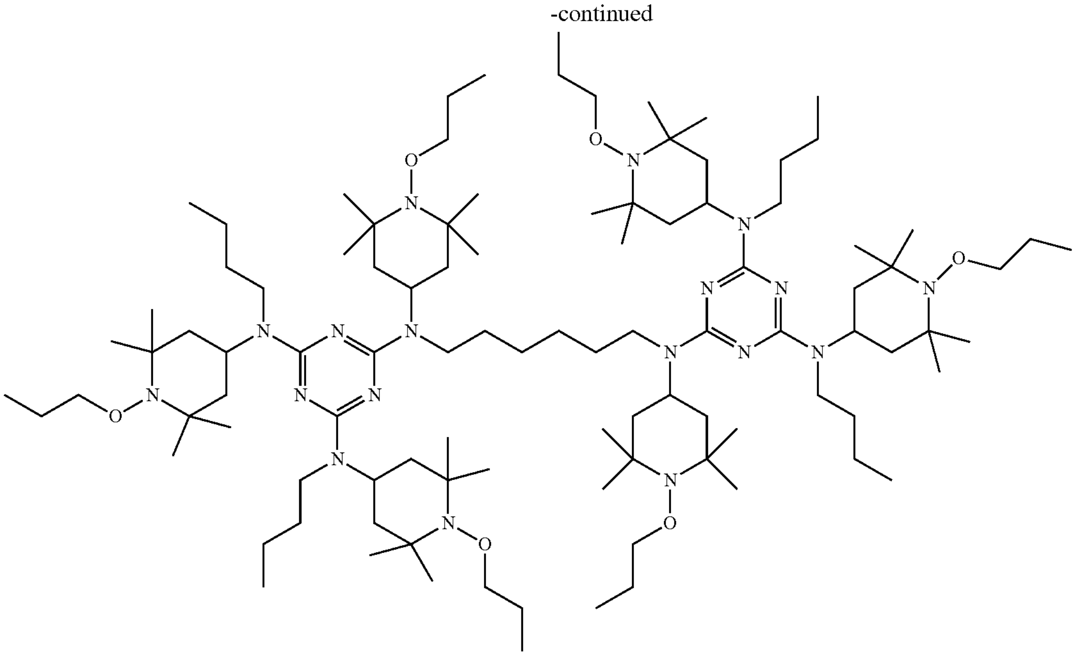
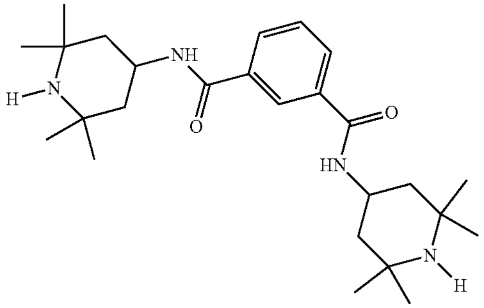
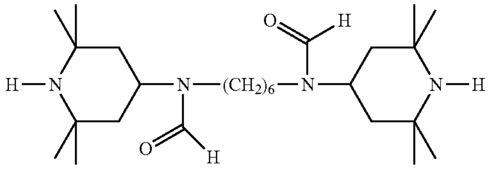
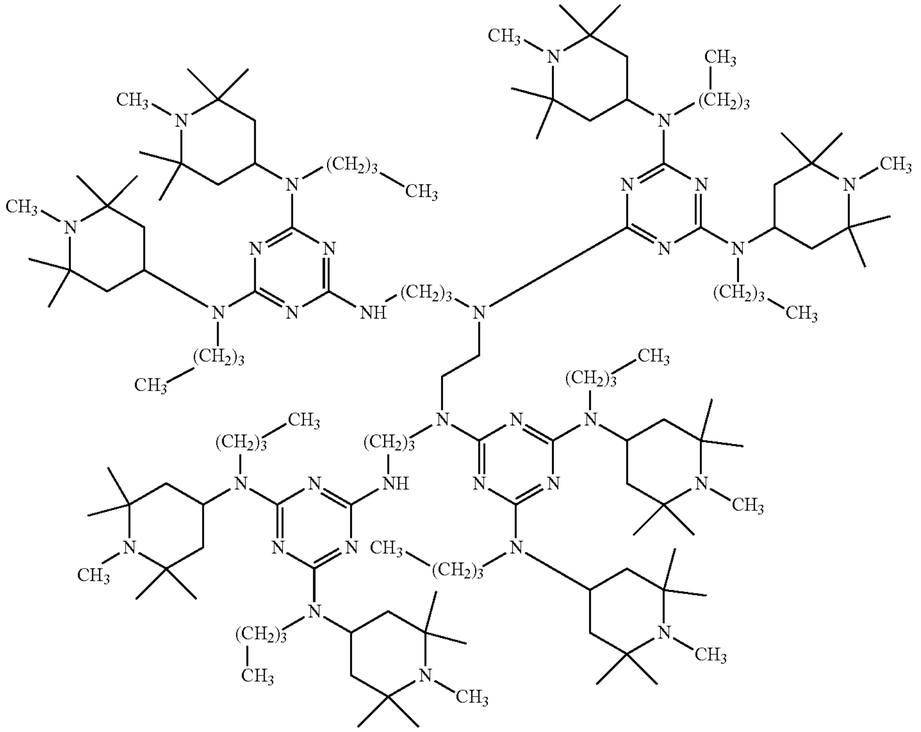

Preferred oligomeric and polymeric hindered amines have the following structures:
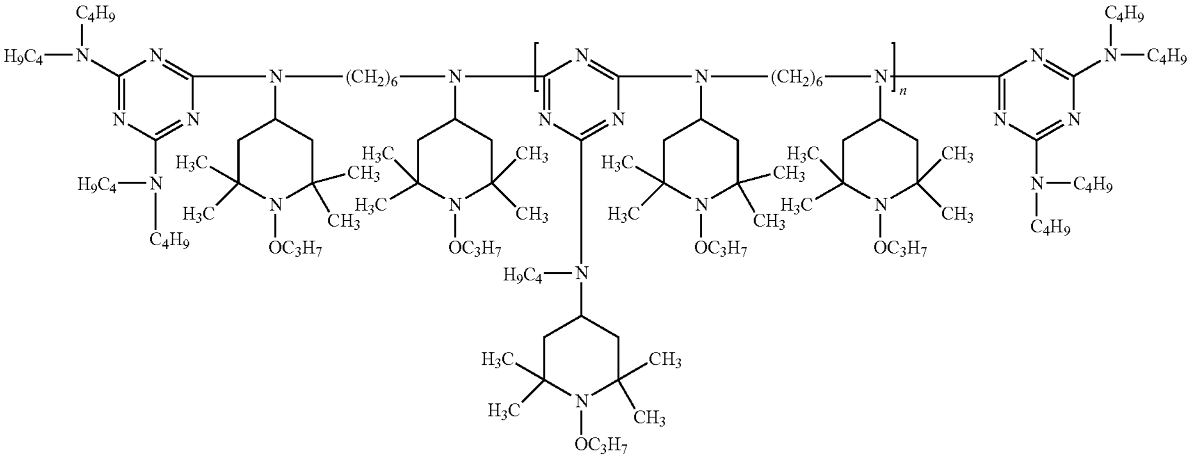
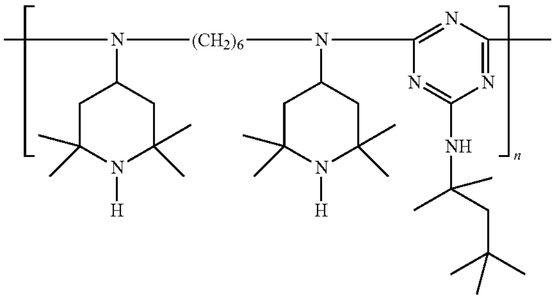
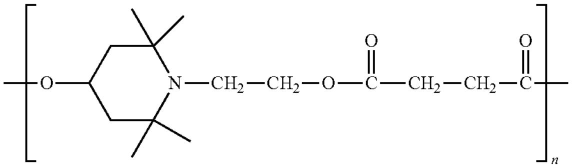
I
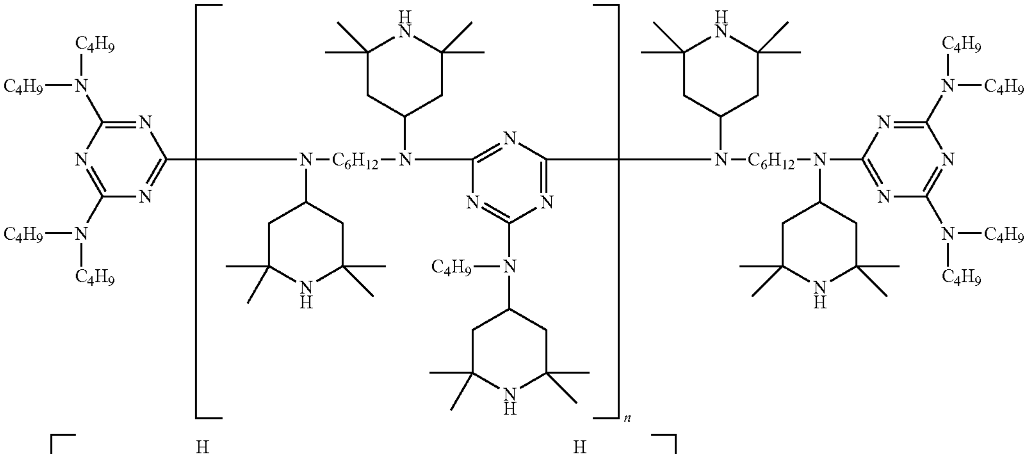
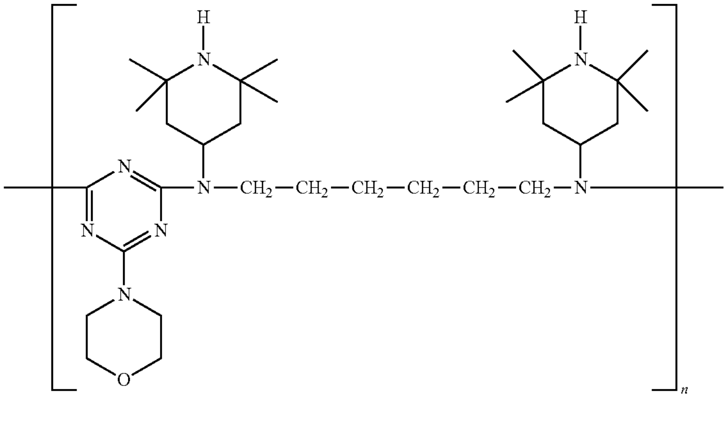

-continued

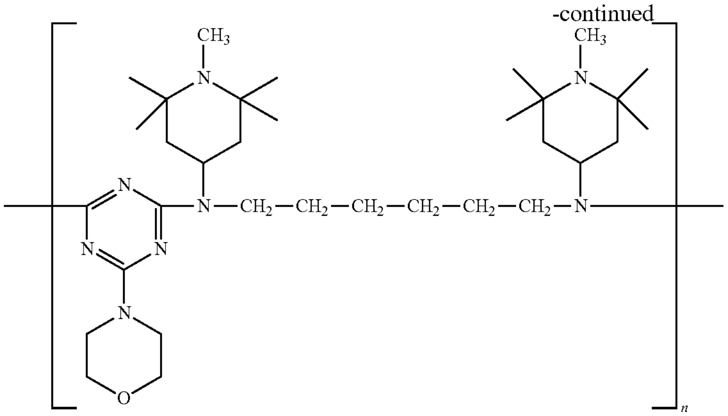

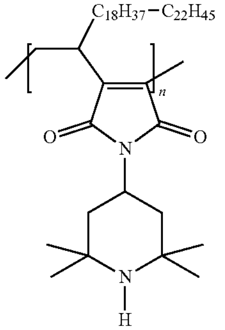

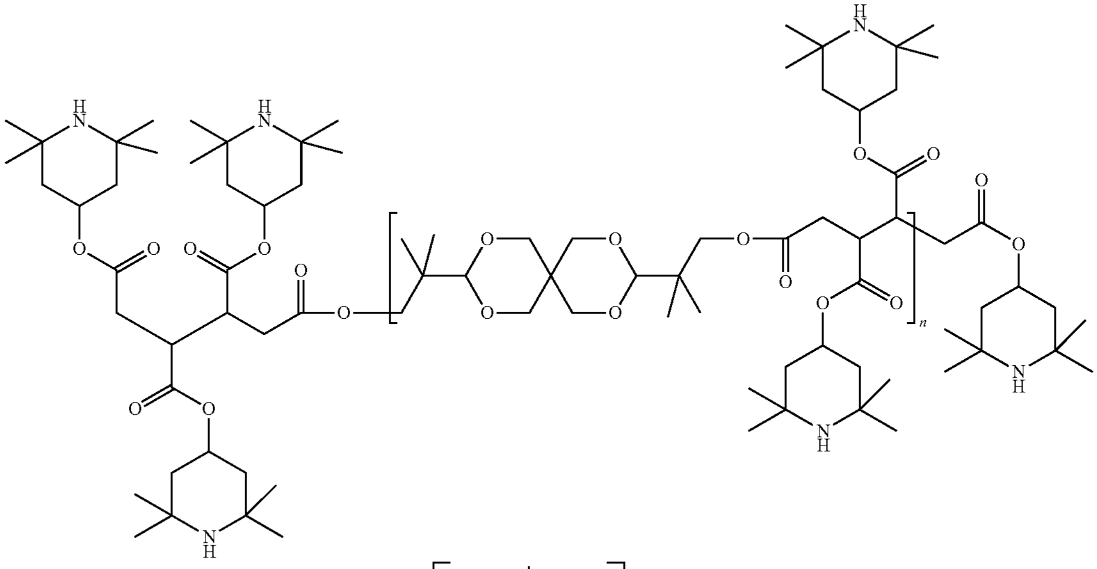

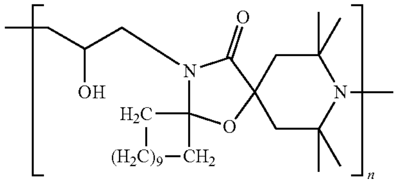

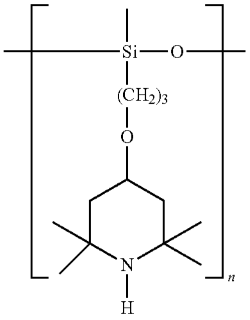

wherein n is an integer from 3 to 100 in each of the aforementioned compounds.

Suitable dispersing agents are, for example:

polyacrylates, for example, copolymers having long chain side groups, polyacrylate block copolymers, alkylamides: for example, N,N'-1,2-ethanediylbisoctadecanamide sorbitan esters, for example, monostearyl sorbitan esters, titanates and zirconates, reactive copolymers having functional groups, for example, polypropylene-co-acrylic acid, polypropylene-co-maleic anhydride, polyethylene-co-glycidyl methacrylate, polystyrene-alt-maleic anhydride-polysiloxanes: for example, dimethylsilanediol-ethylene oxide copolymer, polyphenylsiloxane copolymer, amphiphilic copolymers: for example, polyethylene block polyethylene oxide, dendrimers, for example, dendrimers comprising hydroxyl groups.

Suitable nucleating agents are, for example talc, alkali metal or alkaline earth metal salts of mono- and polyfunctional carboxylic acids, such as e.g. benzoic acid, succinic acid, adipic acid, for example, sodium benzoate, zinc glycerolate, aluminum hydroxybis(4-tert-butyl)benzoate, benzylidene sorbitols, such as e.g. 1,3:2,4-bis(benzylidene)sorbitol or 1,3:2,4-bis(4-methylbenzylidene)sorbitol, 2,2'-methylene-bis-(4,6-di-tert-butylphenyl) phosphate, and trisamides and diamides, such as e.g. trimesic acid tricyclohexylamide, trimesic acid tri(4-methylcyclohexylamide), trimesic acid tri(tert-butylamide), N,N',N"-1,3,5-benzenetriyltris(2,2-dimethylpropanamide) or 2,6-naphthalenedicarboxylic acid dicyclohexylamide.

Suitable antinucleating agents are azine dyes, such as e.g. nigrosine.

Suitable flame retardants are, for example:

a) inorganic flame retardant agents, such as e.g. $Al(OH)_3$, $Mg(OH)_2$, AlO(OH), $MgCO_3$, sheet silicates, such as e.g. montmorillonite or sepiolite, non-modified or organically modified double salts, such as e.g. Mg—Al silicates, POSS (polyhedral oligomeric silsesquioxane) compounds, huntite, hydro magnesite or halloysite and $Sb_2O_3$, $Sb_2O_5$, $MoO_3$, zinc stannate, zinc hydroxystannate, b) nitrogen-comprising flame retardants, such as e.g. melamine, melem, melam, melon, melamine derivatives, melamine condensation products or melamine salts, benzoguanamine, polyisocyanurates, allantoin, phosphacene, in particular melamine cyanurate, melamine phosphate, dimelamin phosphate, melamine pyrophosphate, melamine polyphosphate, melamine metal phosphates, such as e.g. melamine aluminum phosphate, melamine zinc phosphate, melamine magnesium phosphate, and the corresponding pyrophosphates and polyphosphates, poly-[2,4-(piperazin-1,4-yl)-6-(morpholin-4-yl)-1,3,5-triazine], ammonium polyphosphate, melamine borate, melamine hydrobromide, c) radical formers, such as e.g. alkoxyamines, hydroxylamine esters, azo compounds, dicumyl or polycumyl, hydroxyimides and their derivatives, such as e.g. hydroxyimide esters or hydroxyimide ethers d) phosphorus-comprising flame retardants, such as e.g. red phosphorus, phosphates, such as e.g. resorcinol diphosphate, bisphenol A diphosphate and their oligomers, triphenyl phosphate, ethylene diamine diphosphate, phosphinates, such as e.g. salts of hypophosphorous acid and their derivatives, such as e.g. alkyl phosphinate salts for example diethyl phosphinate aluminum or diethyl phosphinate zinc or aluminum phosphinate, aluminum phosphite, aluminum phosphonate, phosphonate esters, oligomeric and polymeric derivatives of methanephosphonic acid, 9,10-dihydro-9-oxa-10-phosphorylphenanthrene-10-oxide (DOPO) and their substituted compounds, e) halogenated flameproofing agents based on chlorine and bromine, such as e.g. polybrominated diphenyl oxides, such as e.g. decabromodiphenyloxide, tris(3-bromo-2,2-bis (bromomethyl)propyl-phosphate, tris (tribromoneopentyl)phosphate, tetrabromophthalic acid, 1,2-bis(tribromophenoxy)ethane, hexabromocyclododecane, brominated diphenylethane, tris-(2,3-dibrompropyl)isocyanurate, ethylene-bis-(tetrabromophthalimide), tetrabromo-bisphenol A, brominated polystyrene, brominated polybutadiene or polystyrene brominated polybutadiene copolymers, brominated polyphenylene ether, brominated epoxy resin, polypentabromobenzylacrylate, optionally in combination with $Sb_2O_3$ and/or $Sb_2O_5$, f) borates, such as e.g. zinc borate or calcium borate, optionally on a carrier material, such as e.g. silica g) sulfur-comprising compounds, such as e.g. elemental sulphur, disulfides and polysulfides, thiuram sulfide, dithiocarbamates, mercaptobenzothiazole and sulfenamides, h) anti-drip agents, such as e.g. polytetrafluoroethylene, i) silicon-comprising compounds, such as e.g. polyphenylsiloxanes, j) carbon modifications, such as e.g. carbon nanotubes (CNT) or graphene and combinations or mixtures thereof.

Suitable fillers and reinforcing materials are, for example, synthetic or natural materials, such as e.g. calcium carbonate, silicates, glass fibers, glass beads (solid or hollow), talc, mica, kaolin, barium sulfate, metal oxides and metal hydroxides, carbon black, graphite, carbon nanotubes, graphene, wood flour or fibers from natural products, such as e.g. cellulose or synthetic fibers. Further suitable fillers are hydrotalcites or zeolites or phyllosilicates, such as e.g. montmorillonite, bentonite, beidelite, mica, hectorite, saponite, vermiculite, ledikite, magadite, illite, kaolinite, wollastonite, attapulgite.

Suitable pigments can be inorganic or organic in nature. Inorganic pigments are, for example, titanium dioxide, zinc oxide, zinc sulfide, iron oxide, ultramarine, carbon black, organic pigments are, for example, anthraquinones, anthanthrones, benzimidazolones, quinacridones, diketopyrrolopyrroles, dioxazines, indanthrenes, isoindolinones, azo compounds, perylenes, phthalocyanines or pyranthrones. Further suitable pigments are metal-based effect pigments or metal-oxide-based pearlescent pigments.

Suitable chain extenders for the linear increase in the molecular weight of polycondensation polymers, polyesters or polyamides are, for example, diepoxides, bis-oxazolines, bis-oxazolones, bis-oxazines, diisocyanates, dianhydrides, bis-acyllactams, bis-maleimides, dicyanates, carbodiimides. Further suitable chain extenders are polymeric compounds, such as e.g. polystyrene-polyacrylate-polyglycidyl(meth) acrylate copolymers, polystyrene-maleic anhydride copolymers and polyethylene-maleic anhydride copolymers.

Suitable optical brighteners are, for example, bisbenzoxazoles, phenylcoumarins or bis(styryl)biphenyls and in particular optical brighteners of the formulas:

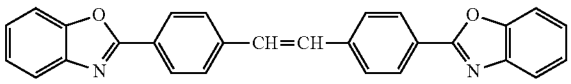

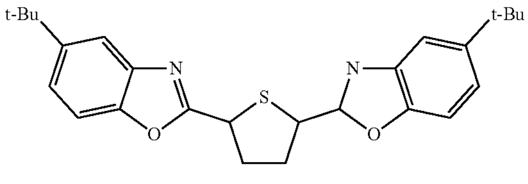

Suitable filler deactivators are, for example, polysiloxanes, polyacrylates, in particular block copolymers like polymethacrylic acid-polyalkylene oxide or polyglycidyl (meth)acrylates and their copolymers for example with styrene, and epoxides, for example, of the following structures:

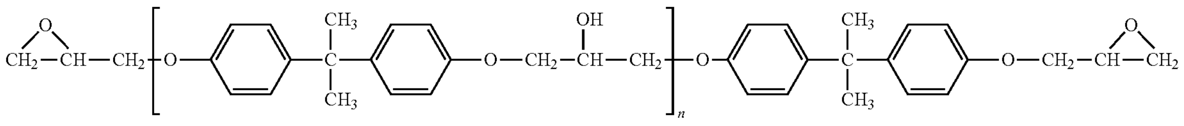

n = 1-10

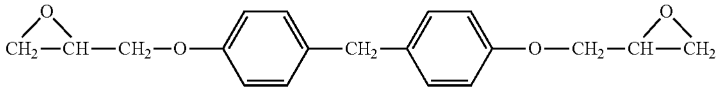

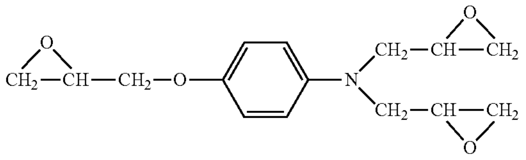

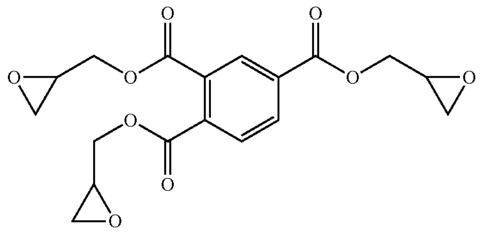

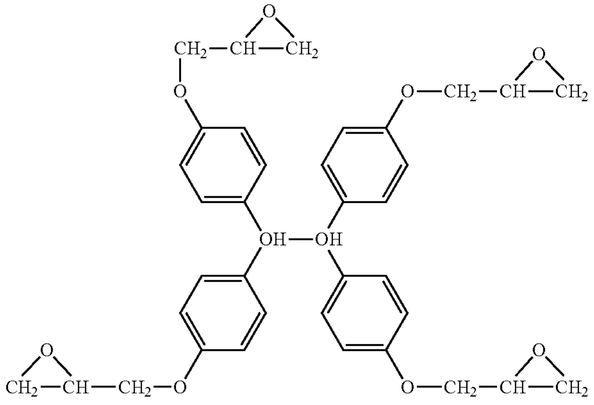

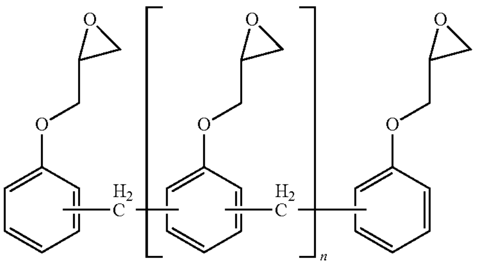

n = 1-10

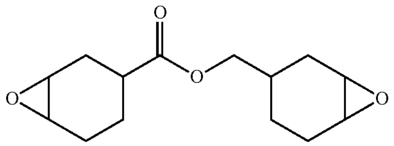

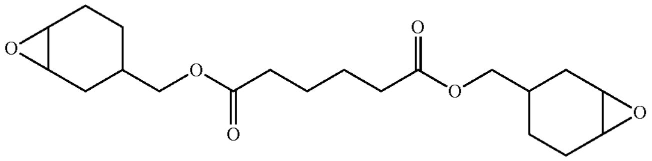

Suitable antistatic agents are, for example, ethoxylated alkylamines, fatty acid esters, alkylsulfonates and polymers, such as e.g. polyetheramides.

Suitable antiozonants are the amines mentioned above, such as e.g. N,N'-diisopropyl-p-phenylenediamine, N,N'-di-sec-butyl-p-phenylenediamine, N,N'-bis(1,4-dimethylpentyl)-p-phenylenediamine, N,N'-dicyclohexyl-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine.

Suitable additives for increasing the molecular weight of polycondensation polymers (chain extenders) are diepoxides, bis-oxazolines, bis-oxazolones, bis-oxazines, diisocyanates, dianhydrides, bis-acyllactams, bis-maleimides, dicyanates, carbodiimides. Further suitable chain extenders are polymeric compounds, such as e.g. polystyrene-polyacrylate-polyglycidyl (meth)acrylate copolymers, polystyrene-maleic anhydride copolymers and polyethylene-maleic anhydride copolymers.

Suitable additives for increasing the electrical conductivity are, for example, the antistatic agents mentioned, carbon black and carbon compounds like carbon nanotubes and graphene, metal powder, such as e.g. copper powder, and conductive polymers, such as e.g. polypyrroles, polyanilines and polythiophenes. Suitable additives for increasing the thermal conductivity are, for example, aluminum nitrides and boron nitrides.

Suitable infrared-active additives are, for example, aluminum silicates, hydrotalcites or dyes like phthalocyanines or anthraquinones.

Suitable mold release agents are, for example, silicones, soaps and waxes, such as e.g. montan waxes.

Suitable impact modifiers are, for example, ethylene copolymers with acrylates, methacrylates and/or ethylenically unsaturated carboxylic acids, which can be completely or partially neutralized with zinc, for example, or copolymers of ethylene, propylene and dienes, and core-shell particles, for example, of polybutyl acrylate and polymethyl methacrylate.

Compatibilizers are used, for example, in thermodynamically immiscible blends or in recyclate mixtures and comprise structural elements of the respective blend components that are mixed. Suitable compatibilizers for polyolefin blends are, for example, olefin block copolymers consisting of ethylene, propylene and alpha-olefins, such as e.g. 1-octene. Other compatibilizers, in particular for compatibilizing polar polymers like PET or polyamides, and nonpolar polymers like PP or PE, are, for example, polypropylene-g-maleic anhydride, polyethylene-g-maleic anhydride, polypropylene-g-acrylic acid, polyethylene-g-acrylic acid, poly(ethylene-co-maleic anhydride), SBS-g-maleic anhydride or SEBS-g-maleic anhydride.

Suitable crosslinking agents are, for example, peroxides like dialkyl peroxides, alkylaryl peroxides, peroxyesters, peroxycarbonates, diacylproxides, peroxyketals, silanes, such as e.g. vinyltrimethoxysilane, vinyltriethoxysilane, vinyltriacetoxysilane, vinyltris(2-methoxyethoxy)silane, 3-methacryloyloxypropyltrimethoxysilane, vinyldimethoxymethylsilane or ethylene-vinylsilane copolymers.

Suitable prodegradants are additives that specifically accelerate or control the degradation of a polymer in the environment. Examples are transition metal fatty acid esters, for example, of manganese or iron, which accelerate oxidative and/or photo-oxidative degradation, for example, of polyolefins, or enzymes which induce hydrolytic degradation, for example, of aliphatic polyesters.

Suitable chemical blowing agents are, for example, azo compounds like azodicarboxylic acid diamide, sulfonylsemicarbazides like p-toluenesulfonylsemicarbazide, tetrazoles such as 5-phenyltetrazole, hydrazides such as p-toluenesulfonylhydrazide, 4,4'-oxibis(benzenesulfonyl) hydrazide, N-nitroso compounds such as N,N'-dinitrosopentamethylenetetramine or carbonates such as sodium bicarbonate or zinc carbonate.

Suitable slip agents are, for example, amide waxes such as erucic acid amide or oleic acid amide.

Suitable antiblocking agents are, for example, silica, talc or zeolites.

Suitable antifogging additives are, for example, ethoxylated sorbitan esters, ethoxylated fatty acid alcohols or ethoxylated alkylamine esters.

Suitable biocides are, for example, quaternary ammonium salts or silver salts, colloidal silver or silver complexes or natural product derivatives, such as e.g. chitosan.

Suitable aldehyde scavengers are amines, hydroxylamines, polyvinyl alcohol, zeolites or cyclodextrins, suitable formaldehyde scavengers are melamine derivatives, such as e.g. benzoguanamine or urea derivatives such as allantoin.

Suitable odor-binding or odor-inhibiting substances are silicates such as calcium silicate, zeolites or salts of hydroxy fatty acids, such as e.g. zinc riceneolate.

Suitable markers are, for example, fluorescent dyes or rare earths.

Suitable mold release agents are, for example, montan waxes.

Furthermore, the present invention relates to the use of an oligomer or polymer according to the invention as a stabilizer for organic materials.

In particular, the oligomers or polymers according to the present invention can be used as a stabilizer against

- thermal, actinic or oxidative degradation of plastics, or as a flame retardant for plastics,
- thermal, actinic or oxidative degradation of oils, fats or waxes, in particular mineral oils, vegetable fats or oils or animal fats or oils, for example palm oil, olive oil, rapeseed oil, linseed oil, soybean oil, sunflower oil, castor oil, fish oils or beef tallow and oils, fats or waxes based on, for example, synthetic esters,
- thermal, actinic or oxidative degradation of mineral or synthetic lubricants, hydraulic oils, engine oils, turbine oils, gear oils, metalworking fluids or lubricating greases, or
- against premature polymerization and/or oxidation of polymerizable monomers, in particular monomers which can be radically polymerized by initiators, like e.g. peroxides or oxygen, such as e.g. acrylic esters, methacrylic esters, acrylonitrile, styrenes or vinyl chloride.

For example, the oligomers or polymers according to the present invention are suitable as stabilizers for plastics in the form of injection molded parts, foils or films, foams, fibers, cables and pipes, profiles, hollow bodies, ribbons, membranes, such as e.g. geomembranes, or adhesives produced via extrusion, injection molding, blow molding, calendering, pressing processes, spinning processes, rotomolding, for example, for the electrical and electronics industry, construction industry, transport industry (car, aircraft, ship, train), for medical applications, for household and electrical appliances, vehicle parts, consumer goods, packaging, furniture, textiles. A further area of application is lacquers, paints and coatings, and the stabilization of oils, fats and lubricants against thermal, actinic or oxidative degradation or as a flame retardant.

The present invention also relates to an intermediate useful in the preparation of an oligomer or polymer according to the invention. The intermediate has the following general Formula IV:

Formula IV

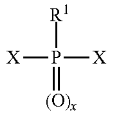

wherein $R^1$ and x are as defined above and

X is the same or different at each occurrence and represents a leaving group, in particular selected from the group consisting of Cl, Br, and I.

Methods for Stabilization

The additive according to the invention, which can be present as a powder, liquid, oil, compacted, on a carrier material, as granulate, solution or flakes, is preferably mixed with the polymer to be stabilized; the polymer matrix is melted and then cooled. As an alternative to this, it is also possible to introduce the additive into a polymer melt in a molten state.

If further components are added to the polymer composition, said components can be added to the polymers separately in the form of liquids, powders, granules or compacted products, or together with the additive composition according to the invention, as described above.

The additive composition described above and optionally additional additives are incorporated into the plastic through conventional processing methods, wherein the polymer is melted and mixed with the additive composition according to the invention and the optionally further additives, preferably using mixers, kneaders and extruders. Extruders, such as e.g. single-screw extruders, twin-screw extruders, planetary roller extruders, ring extruders, co-kneaders, which are preferably equipped with vacuum degassing, are preferred as processing machines. The processing can take place under air or optionally under inert gas conditions.

Furthermore, the additive compositions according to the invention can be produced and introduced in the form of so-called masterbatches or concentrates comprising, for example, 10-90% of the compositions according to the invention in a polymer.

The present invention is described in more detail using the following embodiments, without restricting the subject matter of the present invention to the examples.

Synthesis Example 1: Synthesis of Tocopherol Phosphorus Dichloride 1 ml (11.4 mmol) of phosphorus trichloride, 4.9117 g (11.4 mmol) of α-tocopherol and 40 ml of chloroform are placed in a 250 ml three-necked flask having a reflux condenser and magnetic stirrer. The reaction mixture is heated at 70° C. for 10 hours. The purity and conversion of the a-tocopherol phosphorus dichloride are determined by means of $^1$H and $^{31}$P NMR spectra. The purity of the product is >99%.

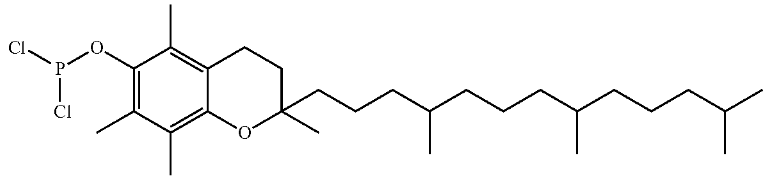 [SMILES: Cc1c(C)c2c(c(C)c1OP(Cl)Cl)CCC(C)(CCCC(C)CCCC(C)CCCC(C)C)O2]

Synthesis Example 2: Synthesis of a Polymeric Phosphite Having Isosorbide Units A structure comparable to that in Example 1 was used. 1.5015 g (10.3 mmol) of isosorbide, 8 ml (36.1 mmol) of triethylamine and 20 ml of acetonitrile are added to the tocopherol phosphorus dichloride. 2 ml (49.3 mmol) of methanol are added after one hour at room temperature. The product is purified in toluene. The purity of the polyphosphite is determined by means of $^1$H and $^{31}$P NMR spectra.

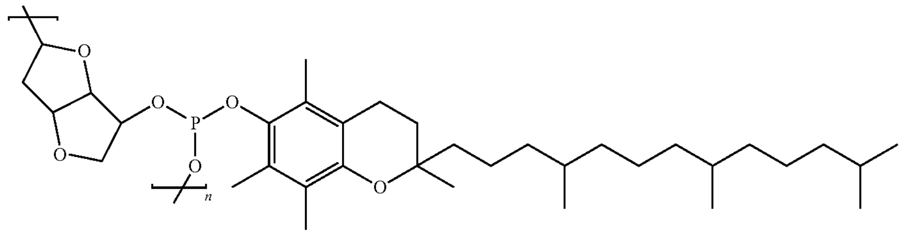

Synthesis Example 3: Synthesis of a Copolymer Comprising Isosorbide and Piperidine Units A structure comparable to that in Example 1 was used. 0.2063 g (1.0 mmol) of 4-hydroxy-2,2,6,6-tetramethylpiperidine-1-ethanol, 4 ml (28.9 mmol) of triethylamine and 20 ml of chloroform are added to the tocopherol phosphorus dichloride. After one hour, 1.3467 g (9.2 mmol) of isosorbide, 5.5 ml (39.7 mmol) of triethylamine and 20 ml of acetonitrile are added to the reaction mixture. 2 ml (49.3 mmol) of methanol are added after one hour at room temperature. The product is purified in toluene. The purity of the polyphosphite is determined by means of $^1$H and $^{31}$P NMR spectra.

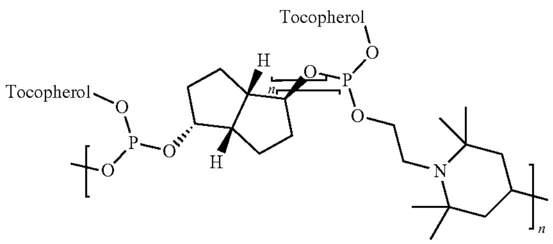

Synthesis Example 4: Synthesis of a Polymeric Phosphite Having Hydroquinone Units

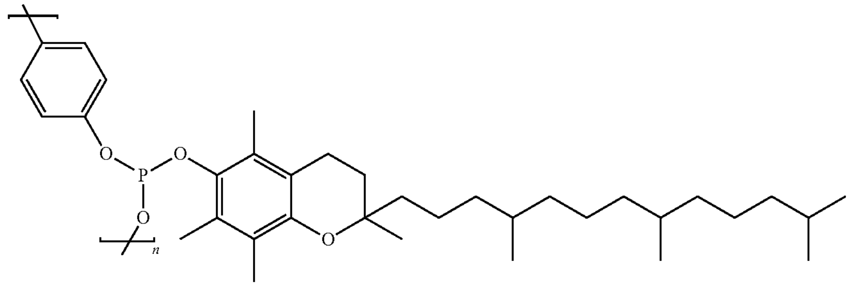

A structure comparable to that in Example 1 was used. 1.1290 g (10.3 mmol) of hydroquinone, 8 ml (36.1 mmol) of triethylamine and 20 ml of acetonitrile are added to the tocopherol phosphorus dichloride. 2 ml (49.3 mmol) of methanol are added after one hour at room temperature. The product is purified in toluene. The purity of the polyphosphite is determined by means of $^1$H and $^{31}$P NMR spectra.

Synthesis Example 5: Synthesis of a Copolymer Comprising Hydroquinone and Piperidine Units A structure comparable to that in Example 1 was used. 0.2065 g (1.0 mmol) of 4-hydroxy-2,2,6,6-tetramethylpiperidine-1-ethanol, 4 ml (28.9 mmol) of triethylamine and 20 ml of chloroform are added to the tocopherol phosphorus dichloride. After one hour, 1.0189 g (9.2 mmol) of hydroquinone, 5.5 ml (39.7 mmol) of triethylamine and 20 ml of acetonitrile are added to the reaction mixture. 2 ml (49.3 mmol) of methanol are added after one hour at room temperature. The product is purified in toluene. The purity of the polyphosphite is determined by means of $^1$H and $^{31}$P NMR spectra.

Synthesis Example 6: Synthesis of a Polymeric Phosphite Having 1,4-Cyclohexanediol Units

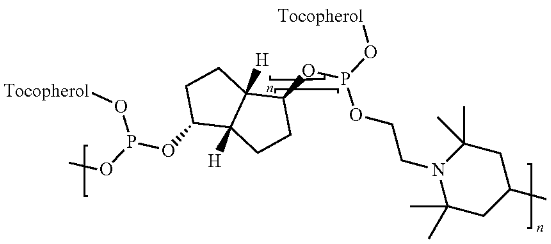

A structure comparable to that in Example 1 was used. 1.1952 g (10.3 mmol) of 1,4-cyclohexanediol, 8 ml (36.1 mmol) of triethylamine and 20 ml of acetonitrile are added to the tocopherol phosphorus dichloride. 2 ml (49.3 mmol) of methanol are added after one hour at room temperature. The product is purified in toluene. The purity of the polyphosphite is determined by means of $^1$H and $^{31}$P NMR spectra.

Synthesis Example 7: Synthesis of a Polyphosphite Having Vanillyl Alcohol Units

A structure comparable to that in Example 1 was used. 1.5862 g (10.3 mmol) of vanillyl alcohol, 8 ml (36.1 mmol) of triethylamine and 20 ml of acetonitrile are added to the tocopherol phosphorus dichloride. 2 ml (49.3 mmol) of methanol are added after one hour at room temperature. The product is purified in toluene. The purity of the polyphosphite is determined by means of $^1$H and $^{31}$P NMR spectra.

Synthesis Example 8: Synthesis of a Polyphosphite Having 1,6-Hexanediol Units

A structure comparable to that in Example 1 was used. 1.2158 g (10.3 mmol) of 1,6-hexanediol, 8 ml (36.1 mmol) of triethylamine and 20 ml of acetonitrile are added to the tocopherol phosphorus dichloride. 2 ml (49.3 mmol) of methanol are added after one hour at room temperature. The product is purified in toluene. The purity of the polyphosphite is determined by means of 1H and $^{31}$P NMR spectra.

Synthesis Example 9: Synthesis of a Polyphosphite Having Hydroxyethyl-4-Hydroxytetramethylpiperidine Units A structure comparable to that in Example 1 was used. 2.0713 g (10.3 mmol) of hydroxyethyl-4-hydroxytetramethylpiperidine, 8 ml (36.1 mmol) of triethylamine and 20 ml of acetonitrile are added to the tocopherol phosphorus dichloride. 2 ml (49.3 mmol) of methanol are added after one hour at room temperature. The product is purified in toluene. The purity of the polyphosphite is determined by means of $^1$H and $^{31}$P NMR spectra.

Example 1: Long-Term Extrusions

The compounds of Examples 2, 3, 4, 6, 7, 8 and 9 and the commercial phosphites ADK STAB 2112 (tris(2,4-di-tert-butylphenol) phosphite) and Doverphos S-9228 (bis(2,4-dicumylphenyl)pentaerythritol diphosphite) were incorporated into polypropylene (Moplen HP 500 N) on a Micro Sec Model 2009. The compounds were processed at 200° C. for 30 minutes and the loss of force was measured.

| Polypropylenes | 100.0% | 99.8% | 99.8% | 99.8% | 99.8% | 99.8% | 99.8% | 99.8% | 99.8% | 99.8% |
|---|---|---|---|---|---|---|---|---|---|---|
| ADK STAB 2112 | | 0.2% | | | | | | | | |
| Doverphos S-9228 | | | 0.2% | | | | | | | |
| Example 2 | | | | 0.2% | | | | | | |
| Example 3 | | | | | 0.2% | | | | | |
| Example 4 | | | | | | 0.2% | | | | |
| Example 6 | | | | | | | 0.2% | | | |
| Example 7 | | | | | | | | 0.2% | | |
| Example 8 | | | | | | | | | 0.2% | |
| Example 9 | | | | | | | | | | 0.2% |
| Residual force | 47% | 65% | 78% | 97% | 94% | 96% | 95% | 94% | 93% | 94% |

| Polypropylenes | 99.8% | 99.6% | 99.6% | 99.6% | 99.6% | 99.6% |
|---|---|---|---|---|---|---|
| Calcium stearate (Comparison) | 0.2% | 0.2% | 0.2% | 0.2% | 0.2% | 0.2% |
| ADK STAB 2112 (Comparison) | | 0.2% | | | | |
| Example 2 | | | 0.2% | | | |
| Example 3 | | | | 0.2% | | |
| Example 4 | | | | | 0.2% | |
| Example 5 | | | | | | 0.2% |
| Residual force | 36% | 44% | 59% | 57% | 75% | 60% |

The polymers according to the invention have a higher residual force than the comparative examples, which results in a greater stabilizing effect.

Example 2: Multiple Extrusions

For further testing, the phosphites were processed with and without a phenolic stabilizer (ADK STAB AO 60, pentaerythritol tetrakis(3-(3,5-di-tert-butyl-4-hydroxyphenyl)propionate)) using a Thermo Scientific Process 11 5 times at 230° C. The MFR (melt flow rate) was determined to analyze the compounds.

| Polypropylene | 99.8% | 99.6% | 99.6% | 99.6% | 99.6% | 99.6% |
|---|---|---|---|---|---|---|
| Calcium stearate (Comparison) | | 0.2% | | | | |
| Example 2 | | | 0.2% | | | |
| Example 3 | | | | 0.2% | | |
| Example 4 | | | | | 0.2% | |
| Example 5 | | | | | | 0.2% |
| MFI extrusion @ 230° C. | | | | | | |
| 1 Extrusion | 17 | 17 | 16 | 15 | 16 | 15 |
| 2 Extrusion | 18 | 17 | 16 | 16 | 16 | 15 |
| 3 Extrusion | 19 | 16 | 16 | 16 | 16 | 15 |
| 4 Extrusion | 19 | 17 | 16 | 16 | 16 | 16 |
| 5 Extrusion | 20 | 17 | 16 | 15 | 16 | 16 |

| Polypropylene | 99.6% | 99.4% | 99.4% | 99.4% | 99.4% | 99.4% |
|---|---|---|---|---|---|---|
| Calcium stearate | 0.2% | 0.2% | 0.2% | 0.2% | 0.2% | 0.2% |
| ADK STAB AO60 (Comparison) | 0.2% | 0.2% | 0.2% | 0.2% | 0.2% | 0.2% |
| ADK STAB 2112 (Comparison) | | 0.2% | | | | |
| Example 2 | | | 00.2% | | | |
| Example 3 | | | | 0.2% | | |
| Example 4 | | | | | 0.2% | |
| Example 5 | | | | | | 0.2% |
| MFI extrusion @ 230° C. | | | | | | |
| 1 Extrusion | 17 | 16 | 16 | 16 | 15 | 15 |
| 2 Extrusion | 18 | 16 | 16 | 16 | 16 | 16 |
| 3 Extrusion | 19 | 16 | 16 | 16 | 15 | 15 |

-continued

| | | | | | | |
|---|---|---|---|---|---|---|
| 4 Extrusion | 19 | 16 | 16 | 15 | 16 | 16 |
| 5 Extrusion | 20 | 16 | 16 | 16 | 15 | 15 |

For multiple extrusion, the lowest MFR value, i.e. the best stabilizer effect, is obtained with the stabilizers according to the invention.

Example 3: Multiple Extrusions at 260° C.

For further testing, the phosphites were processed without a phenolic stabilizer using a Thermo Scientific Process 11 5 times at 260° C. The MFR (melt flow rate) was determined to analyze the compounds.

| Polypropylenes | 99.8% | 99.6% | 99.6% | 99.6% | 99.6% | 99.6% | 99.6% | 99.6% | 99.6% |
|---|---|---|---|---|---|---|---|---|---|
| Calcium stearate | 0.2% | 0.2% | 0.2% | 0.2% | 0.2% | 0.2% | 0.2% | 0.2% | 0.2% |
| ADK STAB 2112 | | 0.2% | | | | | | | |
| Doverphos S-9228 | | | 0.2% | | | | | | |
| Example 2 | | | | 0.2% | | | | | |
| Example 3 | | | | | 0.2% | | | | |
| Example 4 | | | | | | 0.2% | | | |
| Example 6 | | | | | | | 0.2% | | |
| Example 8 | | | | | | | | 0.2% | |
| Example 9 | | | | | | | | | 0.2% |
| MFI extrusion @ 260° C. | | | | | | | | | |
| 1. Extrusion | 30 | 23 | 18 | 19 | 17 | 19 | 17 | 17 | 17 |
| 2. Extrusion | 43 | 27 | 20 | 19 | 18 | 19 | 18 | 18 | 18 |
| 3. Extrusion | 79 | 34 | 21 | 19 | 18 | 20 | 18 | 19 | 18 |
| 4. Extrusion | 128 | 43 | 23 | 20 | 18 | 20 | 19 | 20 | 18 |
| 5. Extrusion | 209 | 60 | 25 | 20 | 19 | 21 | 20 | 22 | 19 |

For multiple extrusion, the lowest MFR value, i.e. the best stabilizing effect, is obtained with the stabilizers according to the invention, even at high temperatures (260° C.).

The invention claimed is:

1. An oligomer or polymer, comprising, as a structural element, a structure according to the general Formula I

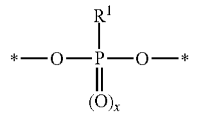

Formula I wherein $R^1$ is defined according to Formula II

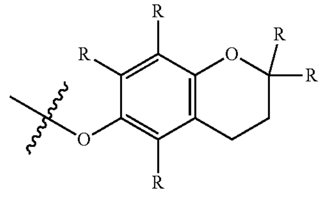

Formula II wherein

R is the same or different at each occurrence and is selected from the group consisting of hydrogen or linear or branched alkyl radicals having from 1 to 36 carbon atoms, and x is 0;

the oligomer or polymer further comprising the following repeating unit of Formula III Formula III

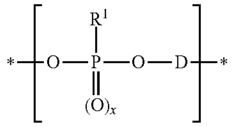

wherein D is the same or different at each occurrence and is a functionality derived A from an aliphatic or heterocyclic.

2. The oligomer or polymer according to claim 1, wherein $R^1$ is defined according to Formula IIa Formula IIa

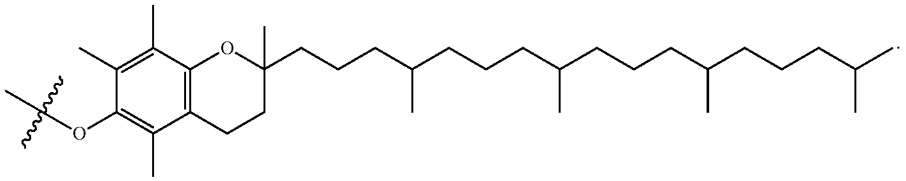

3. The oligomer or polymer according to claim 1, wherein the functionality derived from a diol is a) a functionality derived from an aliphatic diol;

b a functionality derived from a heterocyclic diol; or c) a functionality derived from one of the following diols: 2,3-dimethoxy-1,4-butanediol,

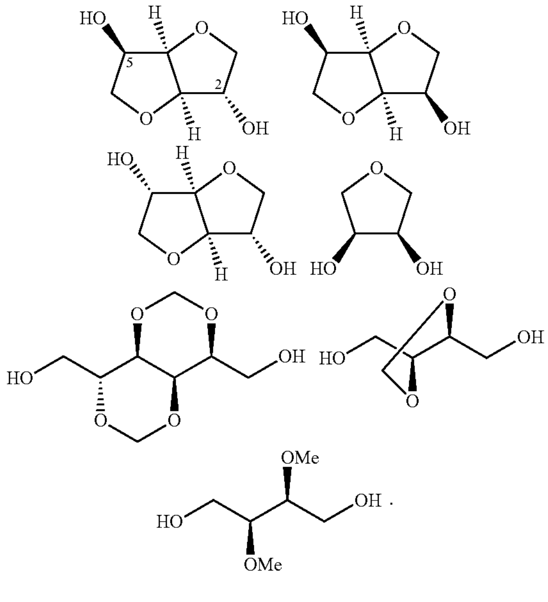

4. The oligomer or polymer according to claim 3, where the functionality derived from a diol is a functionality derived from hydroxyethyl-4-hydroxytetramethylpiperidine, 1,4-dithiane-2,5-diol, or 2,3-dimethoxy-1,4-butanediol.

5. The oligomer or polymer according to claim 1, wherein the repeating unit is defined according to the repeating units of Formulas III and IIIa Formula III

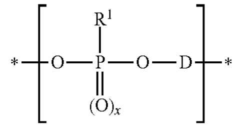

Formula IIIa

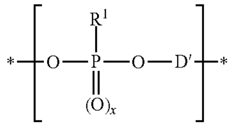

and these are comprised in the oligomer or polymer, wherein D' corresponds to the definition of D, with the proviso that D and D' are derived from different diols.

6. The oligomer or polymer according to claim 5, wherein the molar ratio of the repeating units III to IIIa is from 0.1:99.9 to 50:50.

7. A composition comprising at least one organic component to be stabilized and at least one oligomer or polymer according to claim 1.

8. The composition according to claim 7, wherein the at least one oligomer or polymer is present in a proportion by weight, based on the total composition, of 0.01 to 5.0 parts by weight.

9. The composition according to claim 7, wherein the at least one organic component to be stabilized is selected from the group consisting of plastics, at least one oil, fat or wax, and polymerizable monomers.

10. The composition according to claim 7, comprising at least one additive selected from the group consisting of primary antioxidants, secondary antioxidants, UV absorbers, light stabilizers, metal deactivators, filler deactivators, antiozonants, nucleating agents, antinucleating agents, impact modifiers, plasticizers, lubricants, rheology modifiers, thixotropic agents, chain extenders, processing aids, mold release agents, flame retardants, pigments, dyes, optical brighteners, antimicrobial agents, antistatic agents, slip agents, antiblocking agents, coupling agents, crosslinking agents, anticrosslinking agents, hydrophilic agents, hydrophobic agents, adhesion promoters, dispersants, compatibilizers, oxygen scavengers, acid scavengers, blowing agents, degradation additives, defoaming aids, odor scavengers, marking agents, anti-fogging agents, fillers and reinforcements.

11. A method of stabilizing an organic material comprising incorporating into the organic material an effective amount of an oligomer or polymer according to claim 1.

12. The method according to claim 11, wherein the oligomer or polymer:

provides protection against thermal, actinic or oxidative degradation of plastics, provides flame retardancy to plastics, provides protection against thermal, actinic or oxidative degradation of lacquers, paints and coatings, provides protection against thermal, actinic or oxidative degradation of oils, fats or waxes, provides protection against thermal, actinic or oxidative degradation of mineral or synthetic lubricants, hydraulic oils, engine oils, turbine oils, gear oils, metalworking fluids or lubricating greases, or provides protection against premature polymerization and/or oxidation of polymerizable monomers.

13. A molding compound or a molded part, produced from a plastic composition according to claim 7.

14. The molded part according to claim 13, which is an injection molded part, a foil, a film, a foam, a fiber, a cable, a pipe, a profile, a hollow body, a ribbon, a membrane and/or an adhesive.

* * * * *